(12) United States Patent (10) Patent No.: US 9,290,127 B2
McCabe (45) Date of Patent: Mar. 22, 2016

(54) MIRROR REFLECTIVE ELEMENT

(71) Applicant: MAGNA MIRRORS OF AMERICA, INC., Holland, MI (US)

(72) Inventor: Ian A. McCabe, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/665,066

(22) Filed: Mar. 23, 2015

(65) Prior Publication Data

US 2015/0191123 A1 Jul. 9, 2015

Related U.S. Application Data

(62) Division of application No. 13/469,823, filed on May 11, 2012, now Pat. No. 8,988,755.

(60) Provisional application No. 61/567,448, filed on Dec. 6, 2011, provisional application No. 61/485,794, filed on May 13, 2011.

(51) Int. Cl.
*G02F 1/03* (2006.01)
*G02F 1/07* (2006.01)
(Continued)

(52) U.S. Cl.
CPC . *B60R 1/088* (2013.01); *B60R 1/08* (2013.01); *G02F 1/155* (2013.01); *G02F 1/157* (2013.01); *G02F 1/161* (2013.01)

(58) Field of Classification Search
CPC .......... G02F 1/155; G02F 1/157; G02F 1/61; G02F 1/15; G02F 1/153; G02F 1/163; G02F 1/01; G02F 1/1523; G02F 1/015; G02F 1/167; G02F 1/19; G02F 2001/1555; G02F 1/0018; G02F 1/017; G02F 1/13338; G02F 1/1533; G02F 2001/0157; B60R 1/088; B60R 1/04; B60R 1/082; B60R 1/06; B60R 1/072; B60R 1/12; B60R 2001/1253; B60R 1/00; B60R 1/0602; B60R 1/1207; B60R 2001/1223; B60R 11/04; B60R 1/007; B60R 1/062; B60R 1/07; B60R 1/074; B60R 1/076; B60R 1/08
See application file for complete search history.

(56) References Cited

U.S. PATENT DOCUMENTS 2,263,382 A 11/1941 Gotzinger
2,580,014 A 12/1951 Gazda
(Continued)

FOREIGN PATENT DOCUMENTS

EP 0356099 2/1990
JP 362075619 4/1987

*Primary Examiner* — Thomas K Pham
*Assistant Examiner* — Sharrief Broome
(74) *Attorney, Agent, or Firm* — Gardner, Linn, Burkhart & Flory, LLP

(57) ABSTRACT

A variable reflectance vehicular electro-optic rearview mirror reflective element assembly includes a front substrate and a rear substrate with a perimeter seal disposed therebetween. The front substrate has a first surface and a second surface opposite the first surface, with the second surface having a transparent electrically conductive coating disposed thereat. The rear substrate has a third surface and a fourth surface, with the third surface having a conductive reflector coating disposed thereat. The reflector coating may include a plurality of layers having first and second layers of nickel chromium. The front substrate may have a perimeter band disposed along a perimeter region of the second surface. The perimeter band may include a plurality of layers having first and second layers of nickel chromium.

20 Claims, 11 Drawing Sheets

(51) Int. Cl.
*B60R 1/08* (2006.01)
*G02F 1/155* (2006.01)
*G02F 1/157* (2006.01)
*G02F 1/161* (2006.01)

(56) References Cited

U.S. PATENT DOCUMENTS

| | | |
|---|---|---|
| 3,266,016 A | 8/1966 | Maruyama et al. |
| 3,280,701 A | 10/1966 | Donnelly et al. |
| 4,499,451 A | 2/1985 | Suzuki et al. |
| 4,588,267 A | 5/1986 | Pastore |
| 4,623,222 A | 11/1986 | Itoh et al. |
| 4,630,904 A | 12/1986 | Pastore |
| 4,679,906 A | 7/1987 | Brandenburg |
| 4,712,879 A | 12/1987 | Lynam et al. |
| 4,721,364 A | 1/1988 | Itoh et al. |
| 4,773,740 A | 9/1988 | Kawakami et al. |
| 4,793,690 A | 12/1988 | Gahan et al. |
| 4,799,768 A | 1/1989 | Gahan |
| 4,882,466 A | 11/1989 | Friel |
| 4,882,565 A | 11/1989 | Gallmeyer |
| 4,906,085 A | 3/1990 | Sugihara et al. |
| 5,014,167 A | 5/1991 | Roberts |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,115,346 A | 5/1992 | Lynam |
| 5,117,346 A | 5/1992 | Gard |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,233,461 A | 8/1993 | Dornan et al. |
| 5,253,109 A | 10/1993 | O'Farrell et al. |
| 5,285,060 A | 2/1994 | Larson et al. |
| 5,313,335 A | 5/1994 | Gray et al. |
| 5,354,965 A | 10/1994 | Lee |
| 5,355,245 A | 10/1994 | Lynam |
| 5,406,414 A | 4/1995 | O'Farrell et al. |
| 5,437,931 A | 8/1995 | Tsai et al. |
| 5,446,576 A | 8/1995 | Lynam et al. |
| 5,481,409 A | 1/1996 | Roberts |
| 5,509,606 A | 4/1996 | Breithaupt et al. |
| 5,523,877 A | 6/1996 | Lynam |
| 5,525,264 A | 6/1996 | Cronin et al. |
| 5,550,677 A | 8/1996 | Schofield et al. |
| 5,567,360 A | 10/1996 | Varaprasad et al. |
| 5,575,552 A | 11/1996 | Faloon et al. |
| 5,587,236 A | 12/1996 | Agrawal et al. |
| 5,587,699 A | 12/1996 | Faloon et al. |
| 5,594,222 A | 1/1997 | Caldwell |
| 5,610,756 A | 3/1997 | Lynam et al. |
| 5,668,663 A | 9/1997 | Varaprasad et al. |
| 5,669,698 A | 9/1997 | Veldman et al. |
| 5,689,370 A | 11/1997 | Tonar et al. |
| 5,724,187 A | 3/1998 | Varaprasad et al. |
| 5,786,772 A | 7/1998 | Schofield et al. |
| 5,788,357 A | 8/1998 | Muth et al. |
| 5,790,298 A | 8/1998 | Tonar |
| 5,808,777 A | 9/1998 | Lynam et al. |
| 5,818,625 A | 10/1998 | Forgette et al. |
| 5,825,527 A | 10/1998 | Forgette et al. |
| 5,877,897 A | 3/1999 | Schofield et al. |
| 5,910,854 A | 6/1999 | Varaprasad et al. |
| 5,922,176 A | 7/1999 | Caskey |
| 5,938,320 A | 8/1999 | Crandall |
| 6,001,486 A | 12/1999 | Varaprasad et al. |
| 6,002,511 A | 12/1999 | Varaprasad et al. |
| 6,002,544 A | 12/1999 | Yatsu |
| 6,005,724 A | 12/1999 | Todd |
| 6,111,684 A | 8/2000 | Forgette et al. |
| 6,154,306 A | 11/2000 | Varaprasad et al. |
| 6,164,564 A | 12/2000 | Franco et al. |
| 6,172,613 B1 | 1/2001 | DeLine et al. |
| 6,178,034 B1 | 1/2001 | Allemand et al. |
| 6,196,688 B1 | 3/2001 | Caskey et al. |
| 6,207,083 B1 | 3/2001 | Varaprasad et al. |
| 6,245,262 B1 | 6/2001 | Varaprasad et al. |
| 6,257,746 B1 | 7/2001 | Todd et al. |
| 6,260,608 B1 | 7/2001 | Kim |
| 6,286,965 B1 | 9/2001 | Caskey et al. |
| 6,310,611 B1 | 10/2001 | Caldwell |
| 6,320,282 B1 | 11/2001 | Caldwell |
| 6,356,376 B1 | 3/2002 | Tonar et al. |
| 6,420,036 B1 | 7/2002 | Varaprasad et al. |
| 6,449,082 B1 | 9/2002 | Agrawal et al. |
| 6,512,624 B2 | 1/2003 | Tonar et al. |
| 6,595,649 B2 | 7/2003 | Hoekstra et al. |
| 6,615,438 B1 | 9/2003 | Franco et al. |
| 6,627,918 B2 | 9/2003 | Getz et al. |
| 6,648,477 B2 | 11/2003 | Hutzel et al. |
| 6,669,109 B2 | 12/2003 | Ivanov et al. |
| 6,690,268 B2 | 2/2004 | Schofield et al. |
| 6,719,215 B2 | 4/2004 | Drouillard |
| 6,737,629 B2 | 5/2004 | Nixon et al. |
| 6,742,904 B2 | 6/2004 | Bechtel et al. |
| D493,131 S | 7/2004 | Lawlor et al. |
| D493,394 S | 7/2004 | Lawlor et al. |
| 6,824,281 B2 | 11/2004 | Schofield et al. |
| 6,831,268 B2 | 12/2004 | Bechtel et al. |
| 7,004,593 B2 | 2/2006 | Weller et al. |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |
| 7,289,037 B2 | 10/2007 | Uken et al. |
| 7,310,178 B2 | 12/2007 | Lawlor et al. |
| 7,360,932 B2 | 4/2008 | Uken et al. |
| 7,626,749 B2 | 12/2009 | Baur et al. |
| 8,508,831 B2 | 8/2013 | De Wind et al. |
| 8,673,122 B2 | 3/2014 | McCabe et al. |
| 8,730,553 B2 | 5/2014 | De Wind et al. |
| 2002/0159270 A1 | 10/2002 | Lynam et al. |
| 2003/0043589 A1 | 3/2003 | Blank |
| 2003/0101749 A1 | 6/2003 | Lingle et al. |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0264011 A1 | 12/2004 | Lynam |
| 2005/0078389 A1 | 4/2005 | Kulas et al. |
| 2005/0099693 A1 | 5/2005 | Schofield et al. |
| 2005/0134983 A1 | 6/2005 | Lynam |
| 2006/0050018 A1 | 3/2006 | Hutzel et al. |
| 2006/0061008 A1 | 3/2006 | Karner et al. |
| 2009/0080055 A1* | 3/2009 | Baur ............ B32B 17/10174 359/267 |
| 2010/0066519 A1 | 3/2010 | Baur et al. |
| 2010/0321758 A1 | 12/2010 | Bugno et al. |
| 2014/0022390 A1 | 1/2014 | Blank et al. |

* cited by examiner

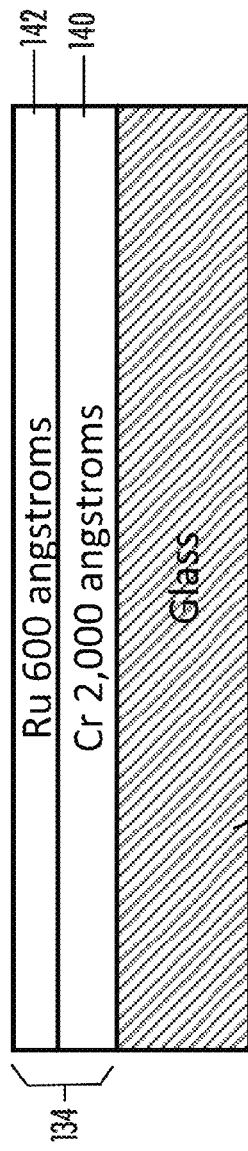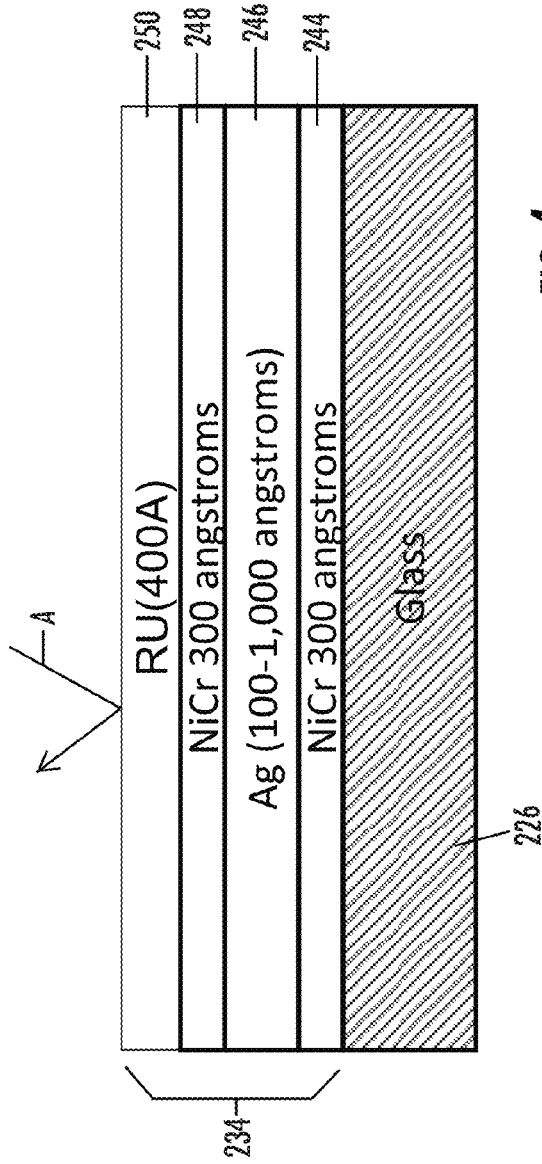

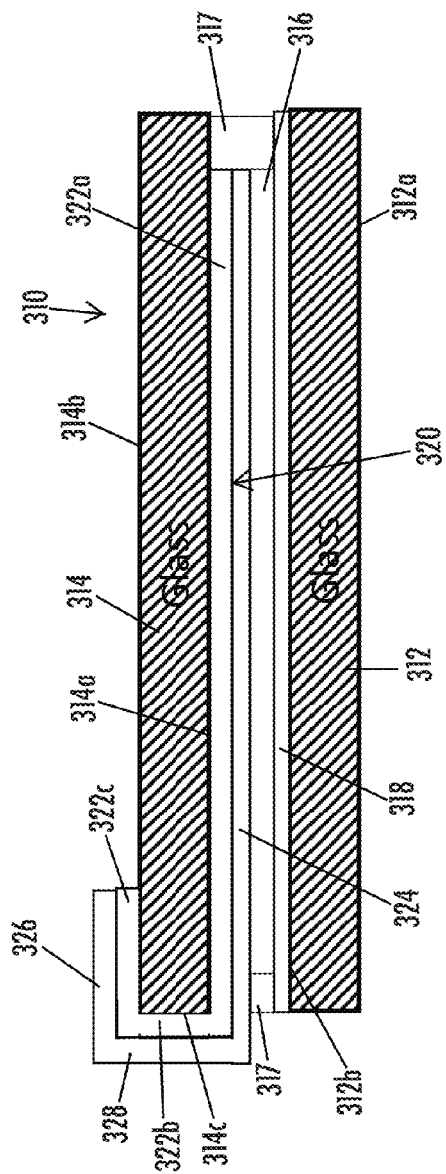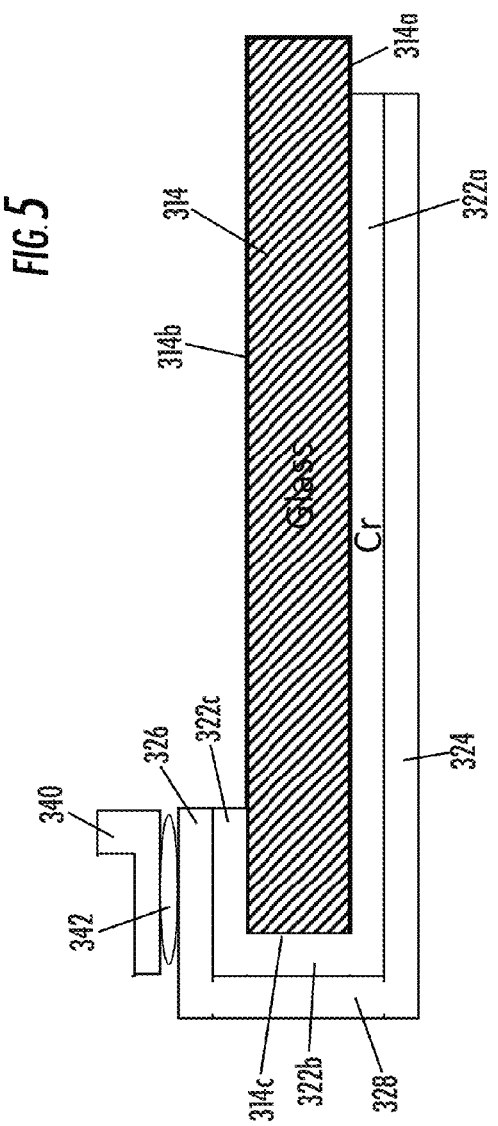
FIG. 5
FIG. 6

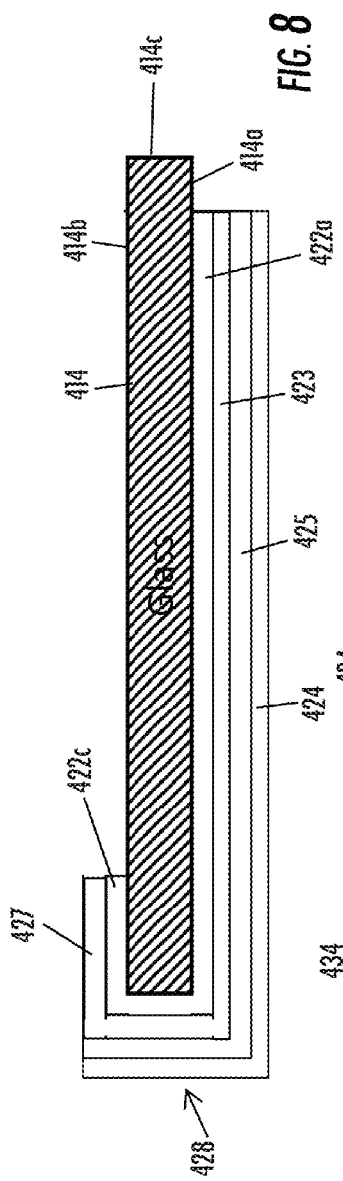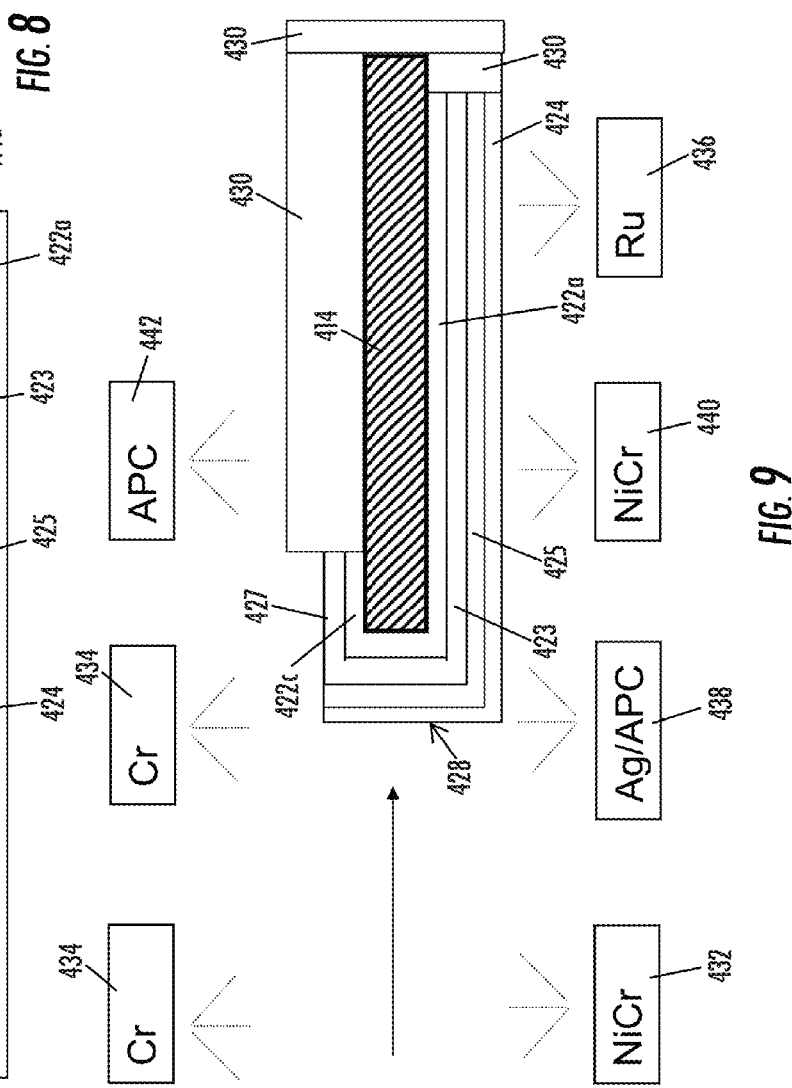

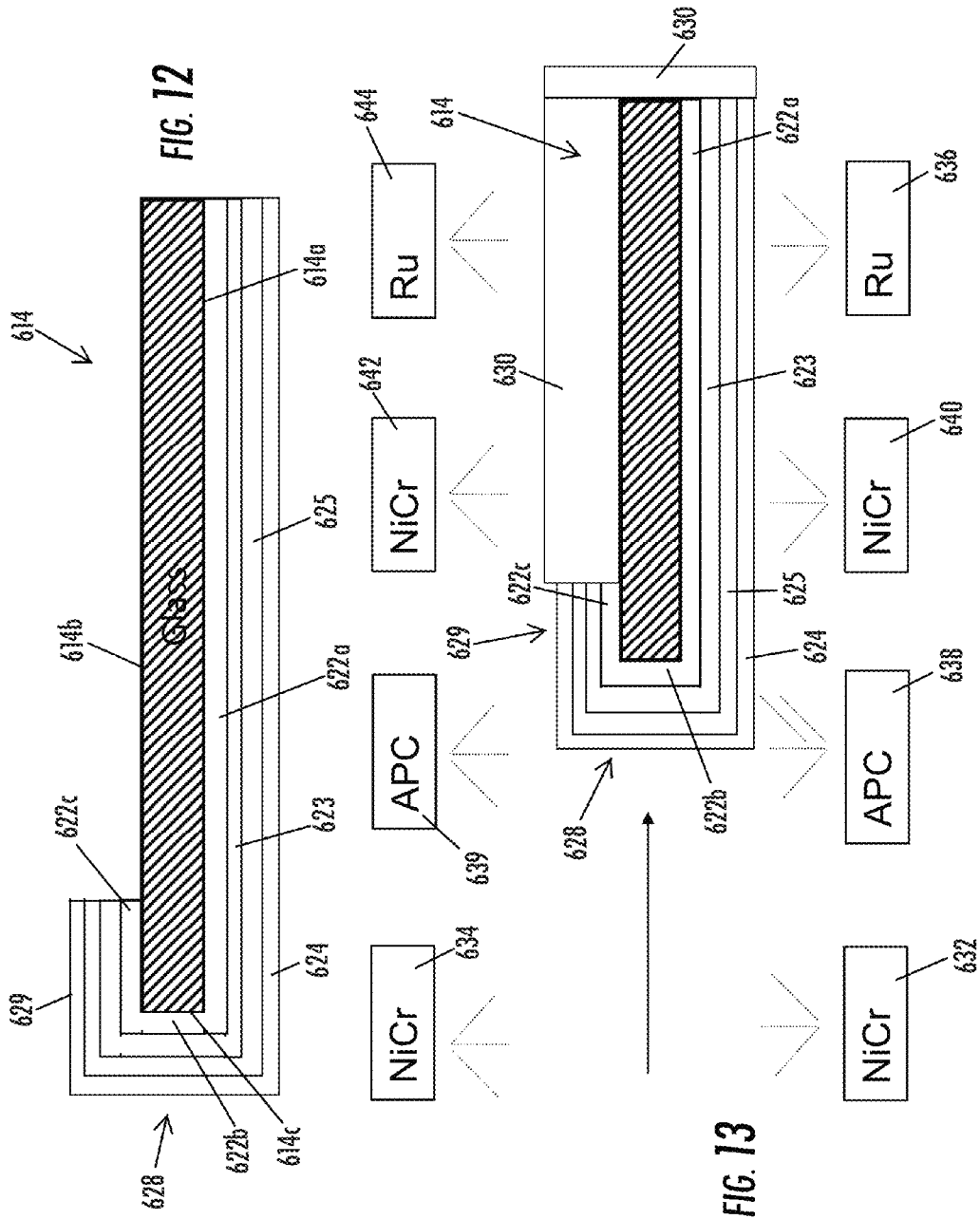

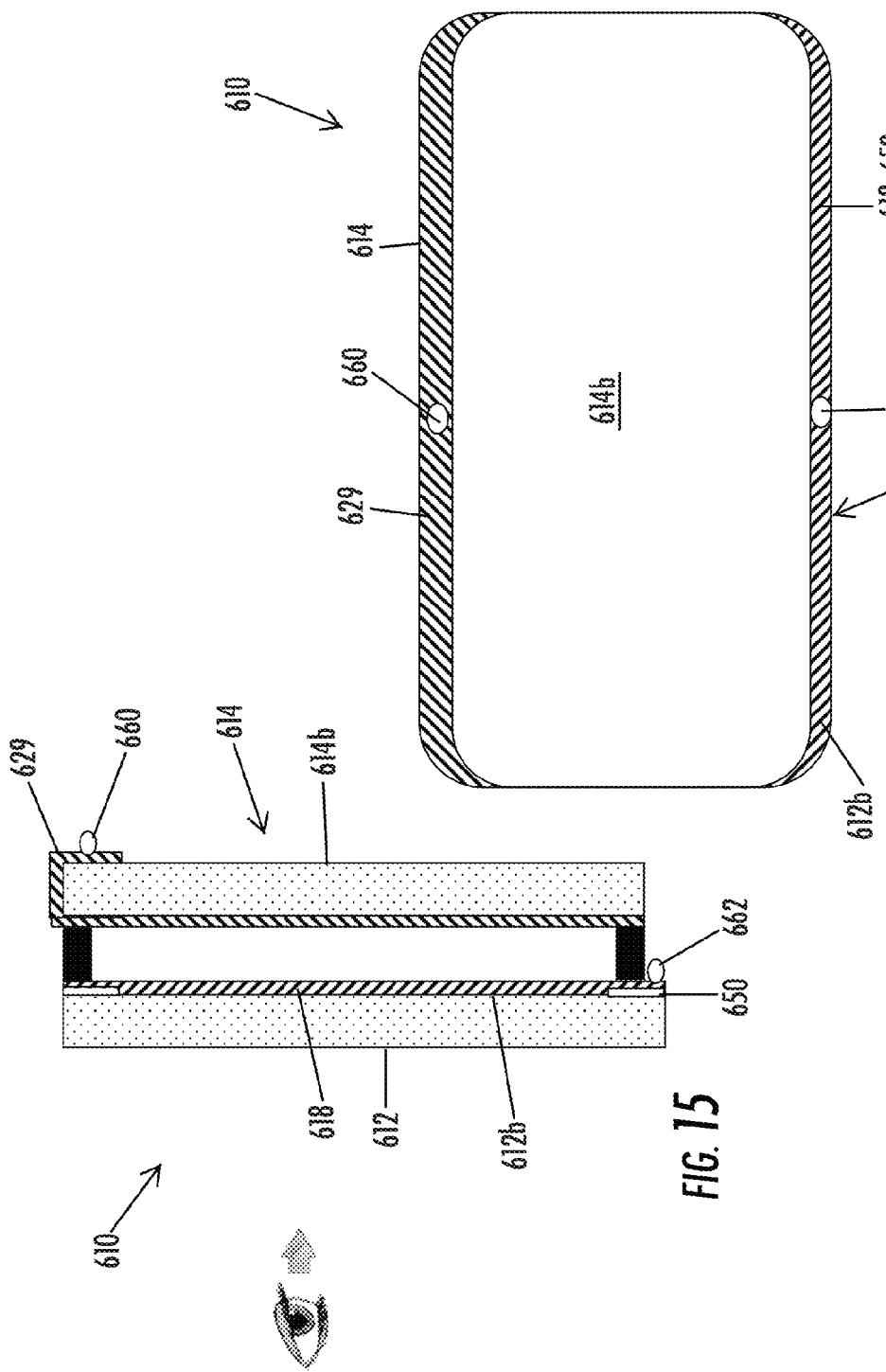

MIRROR REFLECTIVE ELEMENT

CROSS REFERENCE TO RELATED APPLICATIONS

The present application is a divisional of U.S. patent application Ser. No. 13/469,823, filed May 11, 2012, now U.S. Pat. No. 8,988,755, which claims the filing benefit of U.S. provisional applications, Ser. No. 61/567,448, filed Dec. 6, 2011; and Ser. No. 61/485,794, filed May 13, 2011, which are hereby incorporated herein by reference in their entireties.

FIELD OF THE INVENTION

The present invention relates generally to reflective element assemblies for rearview mirrors of vehicles and, more particularly, to electro-optic or electrochromic reflective element assemblies of vehicles.

BACKGROUND OF THE INVENTION

Automotive electrochromic mirror reflective element cell assemblies typically include a front substrate and a rear substrate and an electrochromic medium sandwiched therebetween and contained within an interpane cavity, typically with the electrochromic medium sandwiched between a transparent electrically conductive coating on a second surface of the front substrate and a mirror reflector on a third surface of the rear substrate. In order to achieve a desired electrical surface resistance at the third surface of a third surface reflector mirror reflective element, a relatively thick coating of a base metal (such as a chromium coating or the like) is typically disposed at the third surface, and a less thick but still relatively thick and higher reflecting coating of an expensive metal, such as rhodium, palladium, platinum or ruthenium or the like, is overcoated at or over the base metal layer to provide the desired reflectivity and appearance for the mirror reflective element as viewed through the first surface of the front substrate. The thickness of particularly the base metal layer (such as chromium) may be such that, in order to achieve a desired low sheet electrical resistance for the overall mirror reflector for the likes of larger area exterior electrochromic mirror reflective elements such as used for the likes of mid to large sized SUVs, trucks and/or minivans and/or the like, the base metal layer may exhibit roughness or unevenness in its outer surface, thus requiring an even thicker (and thus potentially more costly) overcoat of the likes of ruthenium or the like so that the overall visible light reflectivity of the mirror reflective element is enhanced and is not deleteriously impacted by surface roughness.

SUMMARY OF THE INVENTION

The present invention provides a mirror reflector with a sandwich of electrically conductive layers disposed at a surface of a mirror substrate. The layers provide the desired level of sheet electrically conductivity and low surface resistance across the surface of the substrate, and preferably comprises a layer of silver or silver alloy disposed or sandwiched between layers of nickel chromium. A relatively thin layer of a high reflectivity material (such as ruthenium or the like, and such as having a specular reflectivity of at least about 70 percent to visible light incident thereon) is disposed over the outer surface of the second nickel chromium layer to provide the desired reflectivity of the mirror reflective element and to provide a desired appearance for the mirror reflective element.

These and other objects, advantages, purposes and features of the present invention will become apparent upon review of the following specification in conjunction with the drawings.

BRIEF DESCRIPTION OF THE DRAWINGS

FIG. 3 is a side elevation of a coated substrate for a reflective element assembly;

FIG. 4 is a side elevation of a coated substrate in accordance with the present invention;

FIG. 5 is a sectional view of an electrochromic mirror reflective element for an interior or exterior mirror assembly of a vehicle in accordance with the present invention;

FIG. 6 is a sectional view of a coated rear substrate of the electrochromic mirror reflective element of FIG. 5, showing an electrical connector attached at a fourth surface coating at the rear or fourth surface of the coated rear substrate;

FIG. 8 is a sectional view of another coated rear substrate of the present invention;

FIG. 9 is a schematic of a coating process for coating the surfaces of the rear substrate of FIG. 8 in accordance with the present invention;

FIG. 12 is a sectional view of another coated rear substrate of the present invention;

FIG. 13 is a schematic of a coating process for coating the surfaces of the rear substrate of FIG. 12 in accordance with the present invention;

FIG. 15 is a sectional view of a rearview mirror assembly having electrical contacts at center regions along the second surface of the front substrate and the fourth surface of the rear substrate in accordance with the present invention; and FIG. 16 is a plan view of the rearview mirror assembly of FIG. 15, having electrical contacts at center regions along the second surface of the front substrate and the fourth surface of the rear substrate in accordance with the present invention.

DESCRIPTION OF THE PREFERRED EMBODIMENTS

Figure 1:
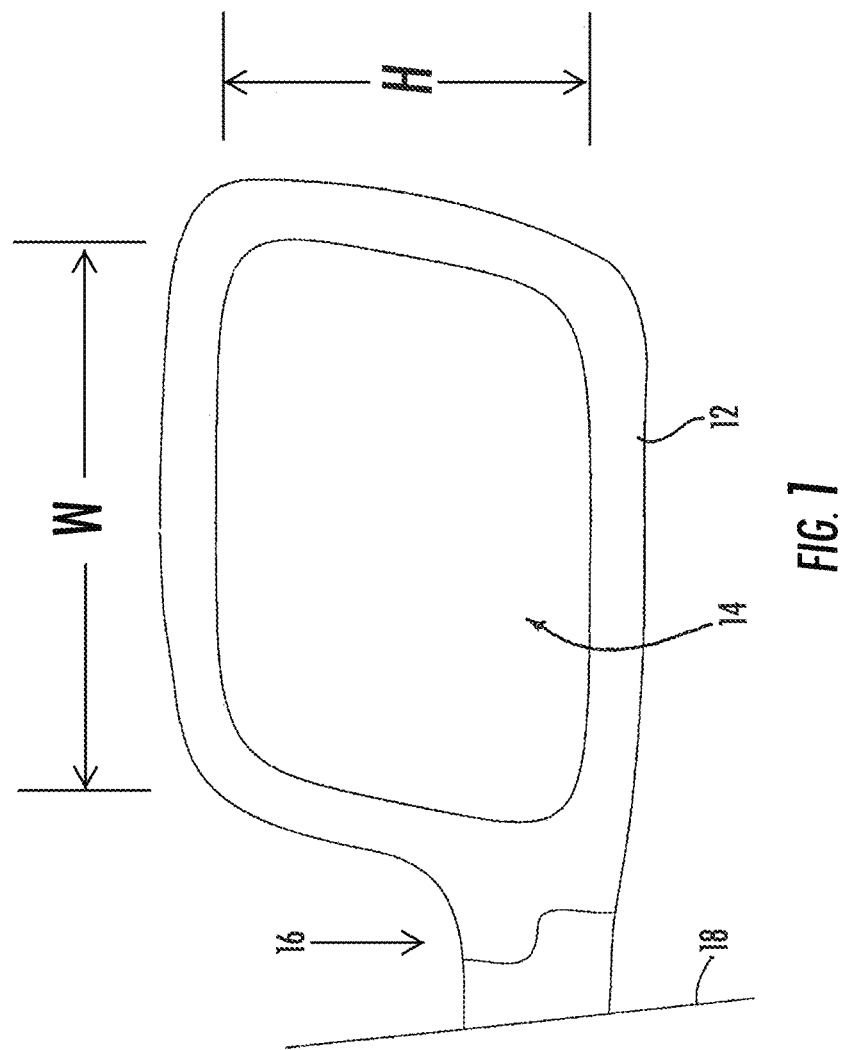
FIG. 1 is a plan view of an exterior rearview mirror assembly in accordance with the present invention.

Referring now to the drawings and the illustrative embodiments depicted therein, an exterior rearview mirror assembly 10 for a vehicle includes a mirror casing 12 and a reflective element 14, with the mirror casing attaching to a mounting structure 16 at the side of the vehicle 18. Mirror assembly 10 is adjustably mounted to an exterior portion of a vehicle (such as to a side of the vehicle or door of the vehicle or the like) via the mounting structure or mounting configuration or assembly 16.

Figure 2:
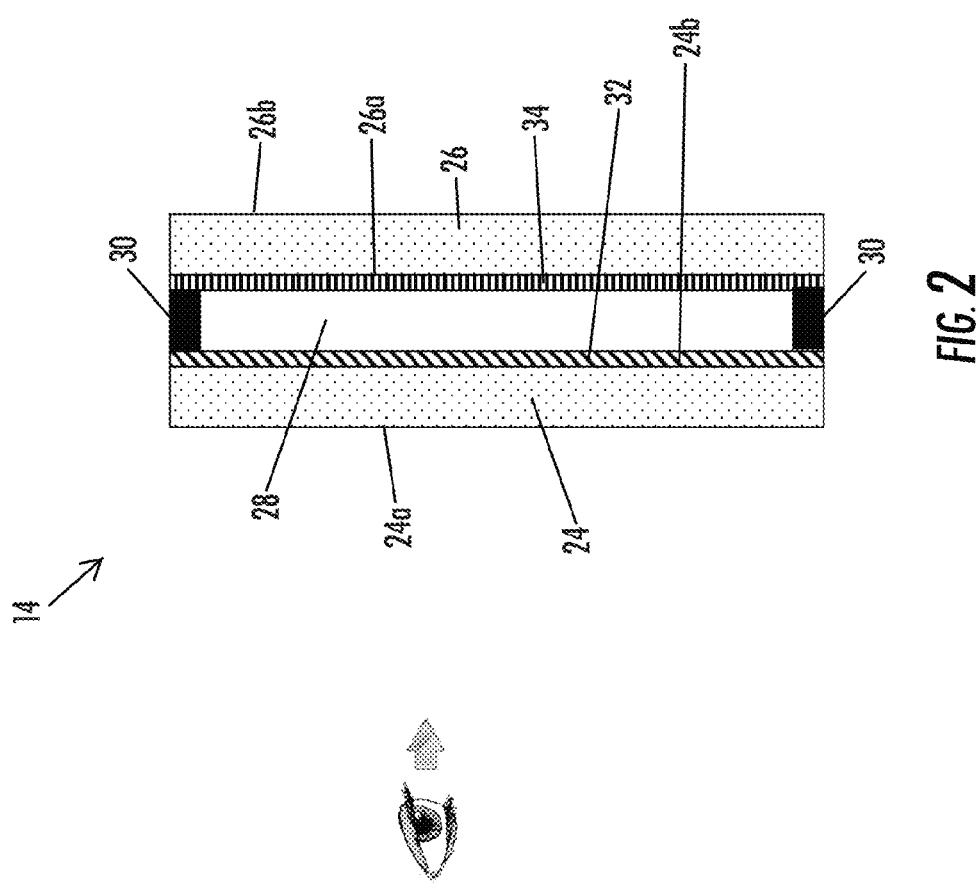
FIG. 2 is a sectional view of a reflective element assembly suitable for use in the exterior rearview mirror assembly of FIG. 1.

As shown in FIG. 2, reflective element 14 comprises an electro-optic (such as electrochromic) reflective element (but may comprise a prismatic or wedge-shaped reflective element), and includes a front substrate 24 having a front or first surface 24a (the surface that generally faces the driver of a vehicle when the mirror assembly is normally mounted at the vehicle) and a rear or second surface 24b opposite the front surface 24a, and a rear substrate 26 having a front or third surface 26a and a rear or fourth surface 26b opposite the front surface 26a, with an electro-optic medium 28 disposed between the second surface 24b and the third surface 26a and bounded by a perimeter seal 30 of the reflective element (such as is known in the electrochromic mirror art). The second surface 24a has a transparent conductive coating 32 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 26a has a metallic reflector coating 34 (or multiple layers or coatings) established thereat. The front or third surface 26a of rear substrate 26 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274,501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The third surface 26a defines the active EC area or surface of the rear substrate within the perimeter seal 30. The coated third surface 26a may also be coated to define a tab-out region (such as by utilizing aspects of the mirror assemblies described in U.S. Pat. Nos. 7,274,501; 7,184,190 and/or 7,255,451, which are hereby incorporated herein by reference in their entireties) for providing electrical connection of the conductive layers to an electrical clip of connector or bus-bar, such as the types described in U.S. Pat. Nos. 5,066,112 and 6,449,082, which are hereby incorporated herein by reference in their entireties.

Typically, for outside mirrors, they are conventionally third surface reflectors. With reference to FIG. 3, the rear substrate 126 of an electro-optic reflective element such as described above may comprise a glass substrate with third surface coatings or layers 134 established thereat. The third surface coatings 134 typically comprise a relatively thick electrically conductive base metal coating 140 (such as chromium or other suitable material) and a less thick but still relatively thick higher reflectivity overcoating or overlying layer 142 (such as ruthenium or rhodium or platinum or palladium, or such as an alloy of any one or more of ruthenium or rhodium or platinum or palladium with each other or with another metal, or other suitable material). Typically, the desired performance of the mirror reflective element (including reflectivity and conductivity to darken or dim the electrochromic medium) is achieved with an electrically conductive chrome or chromium underlayer overcoated with a high reflectivity layer of ruthenium or rhodium or platinum or palladium or the like, which are expensive. Thus, in such dual layer mirror substrates, the underlying base or less expensive metal coating provides the electrically conductive plane across the surface of the rearview mirror (typically an exterior mirror) and the overlying/overcoating more reflective layer provides the required or desired reflectivity.

However, for larger exterior mirrors, such as may be used on a truck or large SUV or the like, to ensure uniformity of coloration from the edges to the center of the reflective element (such as when the mirror is dimmed or darkened to reduce glare), and to avoid a visual iris effect that can be noticeable and disagreeable to a viewer, it is important that the surface resistivity of the overall reflector be low (such as less than about 2 ohms per square, preferably less than about 1 ohms per square, and more preferably less than 0.5 ohms per square). The likes of chromium has a specific resistivity even in its sputter coated form of around $1 \times 10^{-7}$ ohm.cm. Thus, to achieve the desired surface resistivity for the likes of a large area mirror reflective element, a base metal chromium coating of around 2,000 Angstroms or thereabouts (or more or less) may be required. However, such thicker base metal coatings, because of their thickness, results in a rougher outer coated outer surface of the coating, such that when the base coating is overcoated with a higher reflectivity layer, such as a ruthenium layer or the like, the appearance (such as the reflectivity of the mirror reflective element when viewed through the first surface of the mirror reflective element) may be deleteriously affected, requiring a thicker and sometimes much thicker overcoating layer to compensate for the uneven or rough surface of the thicker base metal coating. For example, while normally a mirror manufacturer would like to put no more than about 150 angstroms of ruthenium as an overcoating layer, the manufacturer may have to put about 400 angstroms or about 600 angstroms of ruthenium over the uneven or rough surface of the base metal coating to achieve the desired appearance and smoothness at the rear substrate of the mirror reflective element.

A vehicular exterior sideview mirror has an aspect ratio of typically less than about 2.5 (which is the ratio of a maximum width dimension W to a maximum height dim H (FIG. 1) when the mirror assembly incorporating the reflective element is normally mounted at the exterior side of a vehicle), and often less than about 1.5 or less than about 1.25. And larger area mirror reflective elements typically have an electrochromically active surface area of at least about 175 $cm^2$, often greater than about 225 $cm^2$, sometimes greater than about 275 $cm^2$ or thereabouts. For example, very large mirror reflective elements (such as a mirror reflective element having an active EC active surface area of around 300 $cm^2$) may be suitable for large trucks or SUVs, such as, for example, a MY 2011 Ford F-Series truck or a MY 2011 Dodge Ram truck or the like.

Referring now to FIG. 4, a rear substrate 226 (such as for a large area mirror reflective element, such as a mirror reflective element having, for example, an area of up to or around 300 $cm^2$ or thereabouts, or greater, and preferably having an aspect ratio of less than about 2.5, but could be applicable for larger or smaller reflective elements having different aspect ratios) is coated with a third surface layer 234 that comprises a sandwich of a nickel chromium (NiCr) layer 244 (such as NiCr that is sputtered from a target having about a 80%/20% weight composition or such as other weight compositions, such as, for example, a 60%/40% weight composition) and a silver or silver alloy high conductor layer 246 and a second nickel chromium layer 250 (with the three layer sandwich having a specific resistivity of $1 \times 10^{-6}$ ohm.cm or thereabouts), which provides the desired low or reduced surface resistivity of less than 2 ohms per square. The high conductor layer 246 of the present invention preferably has a specific resistivity of less than about $8 \times 10^{-6}$ ohm.cm. The nickel chromium layers also provide enhanced adhesion and corrosion protection of the silver or silver alloy layer. The three layers 244, 246, 248 may then be overcoated with a thin layer of a higher reflective coating or layer 250 (such as ruthenium or other suitable material). In the illustrated embodiment, the glass substrate 226 is coated with the nickel chromium layer 244 having a thickness of around 300 angstroms (but could be thinner or thicker), which is overcoated with the silver (or silver alloy) layer 246 having a thickness of between about 100 angstroms and about 1,000 angstroms (but could be thinner or thicker), which is overcoated with the second nickel chromium layer 248 having a thickness of about 300 angstroms (but could be thinner or thicker). The electrically conductive sandwich of layers is then overcoated with a ruthenium layer having a thickness of about 200 angstroms to about 400 angstroms (but could be thinner or thicker). Clearly, other thicknesses of the materials may be implemented to achieve the desired electrical conductivity and low surface resistance and high reflectivity for the reflective element, while remaining within the spirit and scope of the present invention. Also, it has been found that that NiCr works well, but other suitable nickel alloys could be used and/or different percent weight concentrations of Ni and Cr could be used.

Such a NiCr/Ag/NiCr/Ru coating or stack configuration can achieve a surface resistance of less than about 0.5 ohms per square and can achieve a reflectivity of light incident thereon of at least about 70% R (as measured such as using a Standard Illuminant A and a photopic detector, such as is prescribed in SAE J964a, which is hereby incorporated herein by reference in its entirety, for the visible light reflecting off of the overcoating ruthenium layer and as viewed and measured at the overcoating ruthenium layer, such as can be seen at A in FIG. 4), whereas conventional coatings of chromium and ruthenium may achieve a surface resistance of about 2 ohms per square or more and may achieve a reflectivity of light incident thereon of less than around 70% R. Moreover, as discussed above, with conventional coatings, as the base metal or chromium layer is made thicker (such as about 1,500 angstroms or more) to get the surface resistance down to around 2 ohms per square, the base metal coating surface becomes rough and it is difficult to get the desired reflectivity from the Cr/Ru stack without using a relatively thick overcoating layer of ruthenium, further adding to the cost of the reflective element.

Optionally, it is envisioned that one or more of the layers of the NiCr/Ag/NiCr stack may extend outboard of the perimeter seal and may wrap around a portion of the perimeter edge of the substrate to provide an electrically conductive wrap around to the fourth or rear surface of the rear substrate. The tab-out or wrap around portion or region may provide electrical connection of the conductive layers to an electrical clip of connector or bus-bar, such as the types described in U.S. Pat. Nos. 5,066,112 and 6,449,082, which are hereby incorporated herein by reference in their entireties, and such as by utilizing aspects of the mirror assemblies described in U.S. Pat. Nos. 7,274,501; 7,184,190 and/or 7,255,451, which are hereby incorporated herein by reference in their entireties).

The NiCr/Ag/NiCr stack of the present invention is much smoother than the conventional thick Cr layer, such that the stack of the present invention allows for a reduced overcoating layer of ruthenium or the like. Also, the NiCr/Ag/NiCr sandwich of layers achieves a very low resistivity (such as about $1.5 \times 10^{-8}$ ohm.cm or thereabouts), which provides a very high electrical conductivity and low surface resistance third surface coating with reduced amount of material. Thus, the base electrically conductive layers (such as NiCr/Ag/NiCr) and the overcoating layer (such as Ru) may provide a low surface resistance of the overall mirror reflector of less than about 1 ohms per square, and more preferably less than 0.5 ohms per square, and may achieve a surface resistance of about 0.1 ohms per square or lower. Because the thicknesses of the layers are reduced compared to a conventionally thick (such as about 2,000 angstroms) layer of chromium, the thinner layers of the NiCr/Ag/NiCr stack limits the surface roughness that occurs when sputter coating thicker layers such as conventionally done. The NiCr/Ag/NiCr stack of layers of the present invention thus are particularly suitable for large area mirror reflective elements, such as for trucks and large SUVs or the like (which may have an active EC area of at least about 200 $cm^2$ to about 300 $cm^2$ or more and an aspect ratio of less than about 2.5 and often less than about 1.5 or less than about 1.25).

Also, the smoother surface allows for a reduced amount of ruthenium (or other highly reflective material) to be disposed thereat or thereover, in order to achieve the desired reflectivity (and it is envisioned that the coatings or layers of the present invention may provide up to about a 30 percent reduction in the amount of ruthenium used in the overcoating layer as compared to conventional coatings). We also find, by using NiCr, a reduced conductivity sensitivity to vacuum coater leaks and thus less stringent requirements on base pressure performance within the vacuum chamber. The composite stack exhibits less intrinsic stress and less pinholes and/or the like, and thus less deformation of fixture masking as compared to a conventional thicker chromium coating. It is found that when sputtering chromium from the likes of a planar magnetron chromium sputtering target in a sputter vacuum deposition chamber, the sputtered chromium tends to break down residual water ($H_2O$) in the sputtering chamber to hydrogen ($H_2$) and oxygen ($O_2$), thus potentially interfering with loading of cryopumps, leading to the need for regeneration of the cryopumps during the vacuum coating or sputtering process. The present invention reduces this effect by reducing the amount of chromium that is to be sputtered onto the substrate. The present invention also provides a reduced need for sandblasting (coater shielding and fixtures) because of the reduced amount of sputtered material/unit time. Also, the present invention provides increased mean times between vacuum coater preventative maintenance operations, and overall provides reduced money spent on coater/fixture maintenance. Another advantage of use of a NiCr alloy coating is that a sputtering target made of a nickel chromium is non-magnetic as compared to, for example, a pure nickel target that is magnetic, and such magnetic targets make it difficult to utilize planar magnetron sputtering targets or techniques or other magnetron assisted sputtering targets or techniques.

Thus the present invention provides a stack of coatings that provide reduced surface resistance at the rear substrate and enhanced reflectivity of light incident thereon. For example, a typical known reflective element may have a layer of chromium of about 2,000 angstroms thick established on the surface of the rear substrate, with an overcoating layer of ruthenium of about 600 angstroms thick, which may provide a surface resistance of the overall reflector of around 2 ohms per square and reflectivity of light incident at the ruthenium coating of around 65% R to 70% R or thereabouts. In comparison, an exemplary embodiment of the present invention may comprise a layer of NiCr of about 300 angstroms thick, a layer of silver of about 1,000 angstroms thick, a second layer of NiCr of about 300 angstroms thick and an overcoating layer of ruthenium of about 400 angstroms thick, which may provide a surface resistance of the overall reflector of around 0.1 ohms per square and reflectivity of light incident at the ruthenium coating of around 70% R or more.

The materials selected for the stack of layers provide the desired low surface resistivity and enhanced reflection of light incident at the coated substrate. For example, the specific resistivity of bulk silver is about $1.6 \times 10^{-6}$ ohm.cm, while the specific resistivity of bulk chromium is about $1.3 \times 10^{-5}$ ohm.cm, and the specific resistivity of bulk NiCr is about $1.1 \times 10^{-4}$ ohm.cm, and the specific resistivity of bulk ruthenium is about $7.2 \times 10^{-6}$ ohm.cm, and other nickel alloys and thicknesses may be selected depending on the particular application.

The stack of layers of the present invention thus may provide reduced surface resistance of the overall mirror reflector at the third surface of the rear substrate of the mirror reflective element, and may provide enhanced reflectivity of light incident on the overcoating layer at the third surface of the rear substrate. Also, the stack of layers of the present invention are environmentally robust, and testing has shown favorable results in environmental testing, including an 85 degrees C./85% RH (relative humidity) test chamber, and a salt mist test, a steam autoclave test and a 150 degree C. dry bake test. Such environmental robustness is particularly beneficial for and makes the mirror reflective element of the present invention particular suitable for exterior mirror applications, where the mirror reflective element is exposed to environmental extremes throughout the life cycle of the mirror assembly and vehicle.

Optionally, other materials may be used in further combination with the NiCr/Ag/NiCr stack of layers discussed above. For example, because the NiCr/Ag/NiCr stack may be softer than a conventional chromium layer (due to the softness of the silver layer), the stack may include a material or alloy to increase the hardness of the stack. For example, an APC alloy (silver-palladium-copper) may be utilized with the NiCr/Ag/NiCr stack to increase the hardness of the stack, while the palladium may improve the corrosion resistance of the silver. Also, optionally, to enhance the adhesion of the ruthenium layer on the NiCr/Ag/NiCr stack, a thin layer of chromium (such as about 200 angstroms thick) may be established over the second NiCr layer to provide an adhesion booster layer between the ruthenium (or other overcoating layer) and the NiCr/Ag/NiCr stack of layers.

Additionally, a mirror substrate coated in accordance with the present invention provides for enhanced performance and appearance to the mirror reflective element and mirror assembly when the mirror assembly is mounted on a vehicle. For example, the reflective element may provide lower % R and faster transition speeds, and these are tangible product competitive advantages, especially for large area outside EC mirrors. Also, the coating layers of the present invention provide more uniform coloration and thus enhanced appearance, and allows for more latitude in cell gap selection.

Optionally, an electro-optic reflective element assembly (such as an electrochromic reflective element assembly) in accordance with the present invention may comprise a front glass substrate and a rear glass substrate with an electro-optic medium disposed therebetween, with the rear glass substrate having a third surface reflector coating that comprises chromium, and with a wraparound portion that wraps around and coats a perimeter cut edge of the rear glass substrate and a portion of the fourth or rear surface of the rear glass substrate, in order to facilitate establishing an electrical connection to the third surface reflector coating at the fourth surface of the rear glass substrate. The rear glass substrate may also be coated by an overcoating layer, such as a thin layer of ruthenium or the like, that overcoats the chromium layer to provide enhanced environmental robustness to the coated substrate and to provide enhanced adhesion of the electrical connector at the fourth surface (such as via a silver conductive epoxy or ink disposed between or at the interface of the electrical connector and the ruthenium overcoating).

For example, and with reference to FIG. 5, an electrochromic reflective element 310 comprises a front substrate 312 and a rear glass substrate 314 with an electrochromic medium 316 disposed therebetween and bounded by a perimeter seal 317. The front substrate 312 has a front or first surface 312a and a rear or second surface 312b, with a transparent conductive coating 318 (such as an indium tin oxide or ITO coating or the like) established thereat, while the rear substrate 314 has a front or third surface 314a and a rear or fourth surface 314b, with a metallic reflector coating or coatings 320 established at the third surface 314a and optionally around or along a perimeter cut edge 314c of the rear substrate and partially onto or over the fourth surface 314b of the rear substrate. The electrochromic medium 316 is disposed between and in contact with the conductive coatings at the rear surface of the front substrate and the front surface of the rear substrate, such as in a known manner.

With such third surface reflector electrochromic reflective element assemblies, it is known to provide a layer of chromium at the third or front surface of the rear substrate, with an overcoating layer of ruthenium, and with both coatings covering a substantial portion of the third surface of the rear substrate, a perimeter cut edge portion of the rear substrate and a portion of the fourth surface of the rear substrate, such that the coatings wraparound the substrate to provide an electrical connection area or region at the rear surface or fourth surface of the rear substrate. The ruthenium layer or overcoating layer is provided to enhance the adhesion of an electrical connector at the fourth surface connection region, such as via a silver conductive epoxy or ink or the like disposed at the interface of the connector and the fourth surface conductive coating. This is because a silver epoxy on chromium coating interface may be unstable and may provide a non-ohmic, high resistance contact, and thus may not be desired. Although the ruthenium layer provides enhanced adhesion at the connector interface, the ruthenium layer may significantly add to the cost of the reflective element assembly.

The present invention provides an overcoating layer (that is coated over a reflector coating of chromium or the like) at least at the fourth surface connecting region or area that replaces the ruthenium coating and that comprises a silver alloy material. For example, the silver alloy coating may comprise a silver-palladium-copper alloy with a 98-1-1 percent weight of Ag—Pd—Cu. As shown in FIGS. 5 and 6, the rear substrate 314 may have a chromium layer portion 322a established at the front or third surface 314a, a chromium layer portion 322b established at the cut edge region 314c, and a chromium layer portion 322c established at the rear or fourth surface 314b of the rear substrate 314. Also, an overcoating layer 324 (such as a thin ruthenium coating) may be established at and may overcoat the chromium layer portion 322a at the front or third surface 314a of the rear substrate, while a silver alloy layer 326 (such as an Ag—Pd—Cu-98-1-1 percent weight composition or alloy) is established at and overcoating the chromium layer portion 322c at the rear or fourth surface 314b of the rear substrate 314. The chromium layer portion 322b at the cut edge region 314c of the rear substrate 314 may be partially overcoated by a conductive coating layer 328 that may comprise either or both of the ruthenium coating 324 and the silver alloy coating or layer 326.

Figure 7:
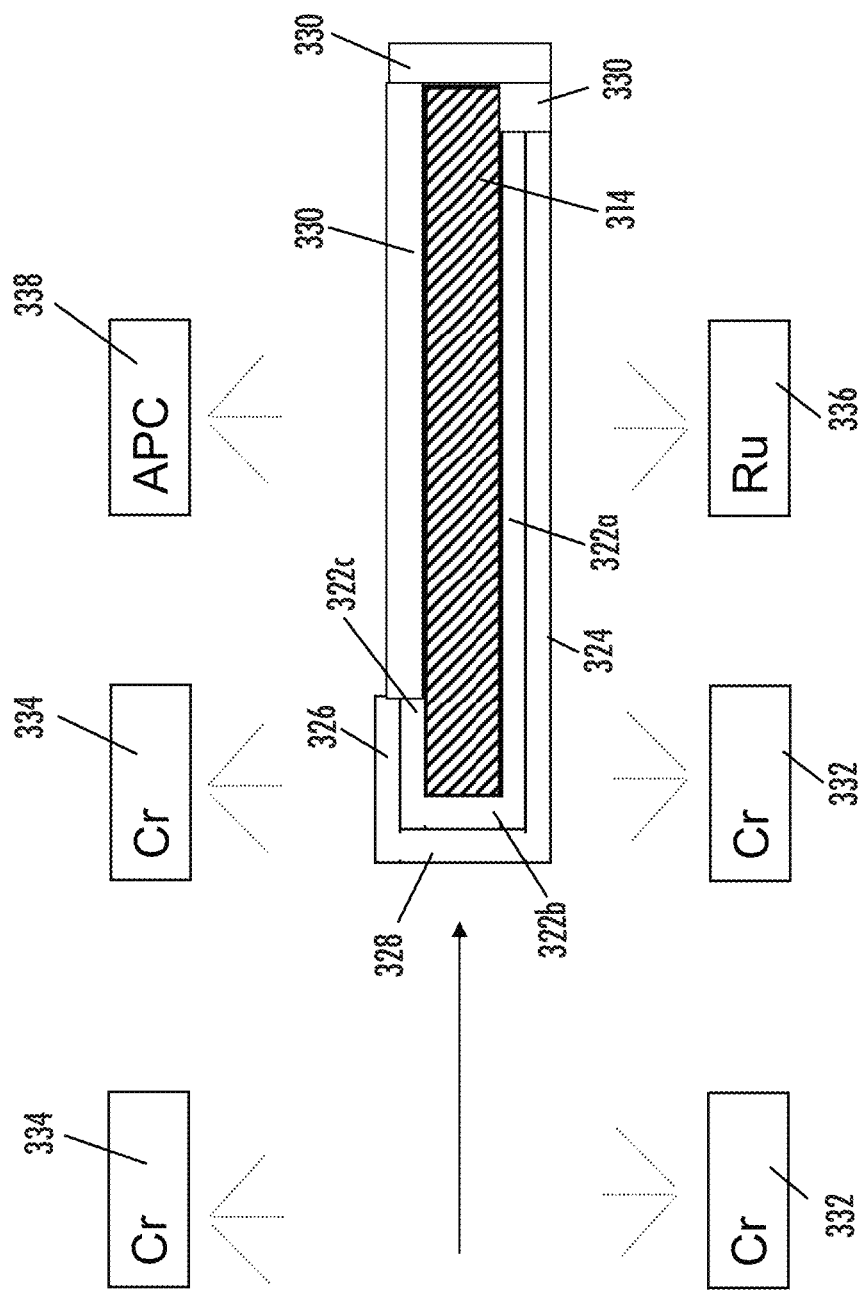
FIG. 7 is a schematic of a coating process for coating the surfaces of the rear substrate of FIG. 6 in accordance with the present invention.

During manufacture of the mirror reflective element assembly, and with reference to FIG. 7, the coatings or layers may be sputter deposited on the surfaces of the rear substrate via suitable sputter targets, such as in a known manner (and/or such as by utilizing aspects of the mirror assemblies and assembly processes described in U.S. Pat. No. 7,255,451, which is hereby incorporated herein by reference in its entirety). For example, and as shown in FIG. 7, the rear substrate 314 may be masked by one or more masks or masking elements 330 and then conveyed or moved or positioned at the sputter targets, such as chromium sputter targets 332, 334 for sputter coating the chromium material at the front and rear surfaces and cut edge surface of the rear substrate. After the chromium coating or layer is deposited at a desired thickness on the surface or surfaces, the rear substrate is moved to or positioned at overcoating targets, such as, for example, a ruthenium target 336 for sputter coating the ruthenium coating material at the front surface and optionally at least a portion of the cut edge surface of the rear substrate, and such as a silver alloy target 338 for sputter coating the silver alloy coating material at the rear surface and at least a portion of the cut edge surface of the rear substrate.

After the substrate is coated, an electrical connector 340 may be attached or adhered at the silver alloy coating layer 326, such as via a silver conductive epoxy (or ink) 342 disposed at and between the electrical connector 340 (which may comprise any suitable connector, such as a silver plated nickel connector or tab that an electrical lead or wire may clip or otherwise connect to) and the silver alloy coating 326. Electrical connection may be established at the electrical connector 340 so that electrical power may be provided to the third surface conductive coatings for dimming or varying the reflectance of the reflective element assembly.

Thus, the present invention may reduce costs by eliminating the use of ruthenium at the fourth surface of the reflective element, particularly for frameless EC mirror assemblies. The silver alloy overcoating provides suitable characteristics that are comparable to ruthenium, such as environmental stability and robustness and conductivity and connectivity, while providing a reduced cost as compared to the relatively expensive ruthenium coatings. Further, the silver alloy overcoating provides enhanced performance as compared to other overcoatings, such as a pure silver overcoating layer or the like. Also, the contact resistance and stability between Cr-APC-Silver epoxy (ink) is substantially enhanced as compared to adhesion of the epoxy to a pure silver overcoating.

The sputtered silver alloy APC (Ag—Pd—Cu 98/1/1% wt) has shown excellent corrosion resistance in corrosion testing, such as in salt mist/spray test and 85 degrees C./85 percent high temp/high humidity tests (such as by placing samples of coated substrates in an 85 degrees C./85% RH (relative humidity) test chamber). Such testing has shown that a pure silver coating falls apart in a day or two under such testing conditions, while the samples coated with the APC silver-based alloy provide enhanced performance. For example, after one day in a salt mist/spray, the samples with a pure silver overcoating showed hazing and after two days in the salt mist/spray were substantially eroded, while the silver alloy samples (having an overcoating layer of the APC alloy that is about 500 angstroms thick) were still in good condition after two weeks in the salt mist/spray test, and in the 85 degrees C./85% RH test chamber, the silver coating was corroding after about a week, while the silver alloy samples were substantially unchanged during similar time periods.

Although shown and described as comprising an Ag—Pd—Cu silver alloy, it is envisioned that other silver alloys or silver-based alloys (such as, for example, a silver-based alloy commercially available from Williams Advanced Materials, Inc. of Buffalo, N.Y., under the tradename Sil-X™, and/or such as described in U.S. Pat. No. 7,033,730, which is hereby incorporated herein by reference in its entirety, or the like) may be implemented at the fourth surface connection area or region, while remaining within the spirit and scope of the present invention. It is further envisioned that use of such silver alloys or silver-based alloys (such as the Ag—Pd—Cu material described above) may be suitable for use at the third surface and wraparound region so that the ruthenium overcoating layer may be completely eliminated.

The sputtered silver alloy coatings have also been tested for robustness compared to pure silver coatings when exposed to an electrochromic medium, such as comprising a solid polymer matrix (SPM) formulation. Such SPM compositions may contain halide impurities, with batch to batch varying concentrations, from the chemical synthesis process. Testing has shown that pure silver coatings have visible hazing with pitting when exposed directly to SPM and may have substantial hazing if the halide impurity concentrations in the SPM are high. Testing of reflective element assemblies or cells filled with SPM having high impurity concentrations has shown that pure silver coatings turn hazy after only a few hours of exposure and, after two weeks of baking, the pure silver coatings are hazy and milky, while, to the contrary, coatings comprising the APC alloy and/or the Sil-X™ material are substantially unchanged.

Optionally, and with reference to FIGS. 8 and 9, the rear substrate 414 may have a nickel chromium (NiCr) layer portion 422a established at the front or third surface 414a and a chromium layer portion 422c established at the rear or fourth surface 414b of the rear substrate 414. A silver or silver alloy coating 423 (such as an APC coating as described above or the like) is disposed at or over the NiCr layer portion 422a. A second NiCr coating or layer 425 is disposed at or over the silver or silver alloy coating 423 at the front surface 414a. Also, an overcoating layer 424 (such as a thin ruthenium coating) may be established at and may overcoat the layers of the NiCr layer portion 422a, the silver or silver alloy coating 423, and the second NiCr layer 425 at the front or third surface 414a of the rear substrate 414, while a silver alloy coating 427 (such as an APC coating or the like, such as an Ag—Pd—Cu-98-1-1 percent weight composition or alloy) is established at and overcoats the chromium layer portion 422c at the rear or fourth surface 414b of the rear substrate 414. The cut edge surface or region 414c of the rear substrate 414 may be partially or entirely overcoated by a conductive coating layer 428 that may comprise any or all of the chromium coating 422c, the first NiCr coating 422a, the silver or silver alloy coating 423, the second NiCr coating 425, the ruthenium coating 424 and the rear surface silver alloy coating or layer 427.

During manufacture of the mirror reflective element assembly, and with reference to FIG. 9, the coatings or layers may be sputter deposited on the surfaces of the rear substrate via suitable sputter targets, such as in a known manner (and/or such as by utilizing aspects of the mirror assemblies and assembly processes described in U.S. Pat. No. 7,255,451, which is hereby incorporated herein by reference in its entirety). For example, and as shown in FIG. 9, the rear substrate 414 may be masked by one or more masks or masking elements 430 and then conveyed or moved or positioned at the sputter targets, such as chromium sputter targets 434 and NiCr sputter targets 432 for sputter coating the chromium material or layer 422c and the NiCr material or layer 422a at the respective front and rear surfaces of the rear substrate and at least partially at the cut edge surface 414c of the rear substrate. After the chromium and NiCr coatings or layers are deposited at a desired thickness on the surface or surfaces, the rear substrate is moved to or positioned at overcoating targets, such as, for example, a silver or silver alloy (such as APC or the like) target 438, which establishes the silver or silver alloy coating or layer 423 at the first NiCr layer 422a at the front surface 414a of the rear substrate (and at least partially at the cut edge surface), and the substrate is then moved to or positioned at overcoating targets 440, 442, with target 440 establishing the second NiCr layer 425 at and over the silver or silver alloy layer 423 and first NiCr layer 422a at the front surface 414a of the rear substrate (and at least partially at the cut edge surface), and with the target 442 establishing the silver alloy (such as APC) layer 427 at the rear surface of the substrate and at and overcoating the chromium layer 422c and at least a portion of the cut edge surface of the rear substrate. The coated substrate is moved to or positioned at a ruthenium target 436 for sputter coating the ruthenium coating material or layer 424 at the front surface and optionally at least a portion of the cut edge surface of the rear substrate.

After the substrate is coated, an electrical connector may be attached or adhered at the silver alloy coating layer, such as via a silver conductive epoxy (or ink) disposed at and between the electrical connector (which may comprise any suitable connector, such as a silver plated nickel connector or tab that an electrical lead or wire may clip or otherwise connect to) and the silver alloy coating, such as in a similar manner as described above. Electrical connection may be established at the electrical connector so that electrical power may be provided to the third surface conductive coatings for dimming or varying the reflectance of the reflective element assembly.

Optionally, the reflective element may include a metallic perimeter band around the perimeter of the reflective element, such as by utilizing aspects of the reflective elements described in U.S. Pat. Nos. 7,626,749; 7,274,501; 7,184,190 and/or 7,255,451, and/or U.S. patent application Ser. No. 11/226,628, filed Sep. 14, 2005 and published Mar. 23, 2006 as U.S. Publication No. US-2006-0061008, which are hereby incorporated herein by reference in their entireties. Optionally, the perimeter band may comprise a chrome/chromium coating or metallic coating and may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, the mirror reflective element may comprise a frameless reflective element (such as a frameless exterior mirror assembly or a frameless interior mirror assembly), such as by utilizing aspects of the reflective elements described in U.S. Pat. Nos. 7,626,749; 7,360,932; 7,289,037; 7,255,451; 7,274,501 and/or 7,184,190, and/or PCT Application No. PCT/US2010/32017, filed Apr. 22, 2010 and published Oct. 28, 2010 as International Publication No. WO 2010/124064; and/or PCT Application No. PCT/US2010/51741, filed Oct. 7, 2010 and published Apr. 14, 2011 as International Publication No. WO 2011/044312; and/or PCT Application No. PCT/US2011/056295, filed Oct. 14, 2011, and/or U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are hereby incorporated herein by reference in their entireties.

Optionally, for example, the perimeter band may comprise a dark or dark colored band for a frameless EC mirror. Optionally, the perimeter band material may comprise a "black chrome" type of material, such as $Cr/CrO_x$ or the like. Optionally, the band material may be based on Cr/Si and may produce a dark blue colored band. The Cr/Si material may provide enhanced appearance and may be easier to produce as compared to $Cr/CrO_x$ because the Cr/Si material does not involve reactive sputtering of Cr in $O_2$ to produce $CrO_x$ and the deposition rates of Cr/Si are typically higher than $Cr/CrO_x$.

Figure 10:
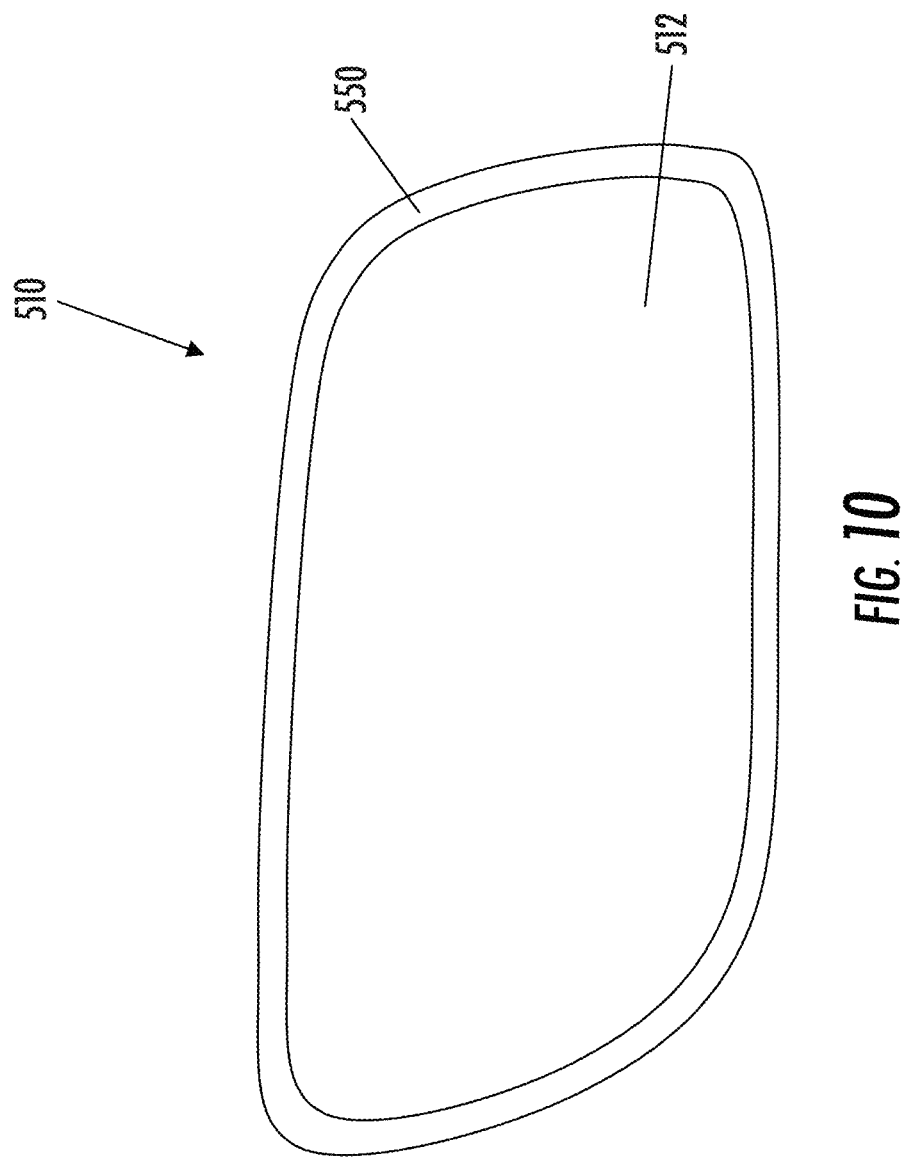
FIG. 10 is a plan view of another exterior rearview mirror assembly having a perimeter band or hiding band in accordance with the present invention.
Figure 11:
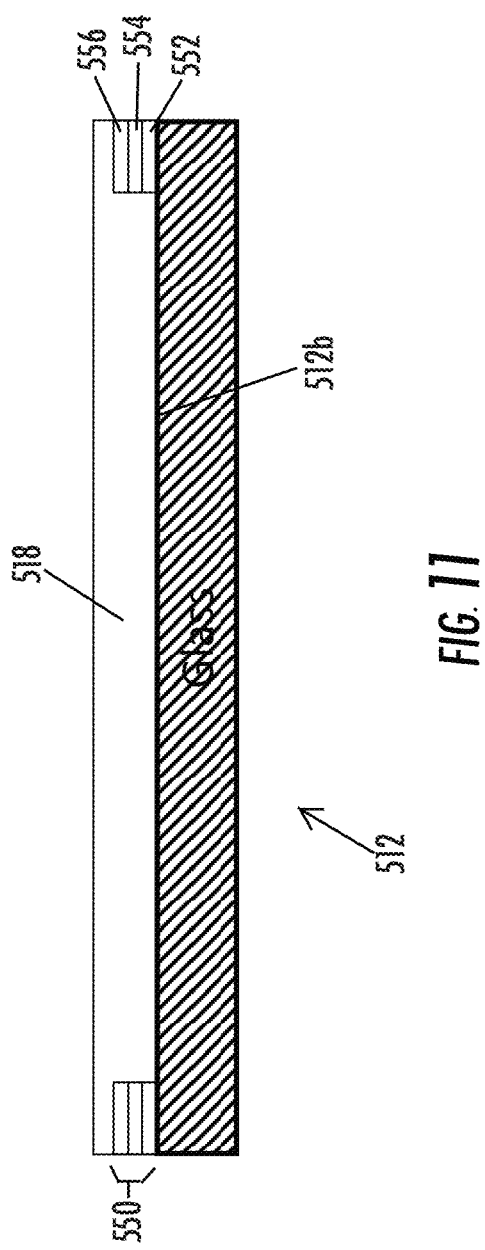
FIG. 11 is a sectional view of the exterior rearview mirror assembly of FIG. 10.

Optionally, the perimeter band may comprise multiple layers or coatings. For example, and as can be seen with reference to FIGS. 10 and 11, a reflective element assembly 510 (such as for an exterior rearview mirror assembly of a vehicle) includes a perimeter band 550 disposed along the perimeter region of the rear or second surface 512b of the front substrate 512. In the illustrated embodiment, the perimeter band 550 comprises a first layer 552 of nickel chromium (NiCr) deposited or established at the second surface 512b of the front glass substrate 512 and around or along the perimeter region of the substrate surface, with a layer 554 of silver or silver alloy (such as an APC alloy or the like) deposited or established over the first layer of NiCr 552, and with a second layer 556 of NiCr deposited or established over the silver or silver alloy layer 554. The perimeter band stack of layers may be over coated with a transparent conductive coating 518 (such as ITO or the like) that is deposited or established at the second surface or rear surface 512b of the front glass substrate 512 (such as an ITO coating having a thickness of, for example, about 1200 angstroms or more or less and providing a sheet resistance of, for example, about 12 ohms/square or more or less). Such a stack of layers for the perimeter band provides increased electrical conductivity at the band, which enhances the speed of coloring/dimming and bleaching of the electrochromic reflective element and enhances the uniformity of the coloring/dimming and bleaching of the electrochromic reflective element. Although shown in FIG. 10 as being an exterior mirror reflective element assembly, aspects of the present invention may be incorporated into an interior mirror reflective element assembly while remaining within the spirit and scope of the present invention.

Optionally, and with reference to FIGS. 12 and 13, a rear substrate 614 of a rearview mirror assembly may have a nickel chromium (NiCr) layer portion 622a established at the front or third surface 614a and a nickel chromium layer portion 622b established along the perimeter edge of the rear substrate between the first and third surfaces and a nickel chromium layer portion 622c established at the rear or fourth surface 614b of the rear substrate 614. A silver or silver alloy coating 623 (such as an APC coating as described above or the like) is disposed at or over the NiCr layer portions 622a, 622b, 622c. A second NiCr coating or layer 625 is disposed at or over the silver or silver alloy coating 623 at the front surface 614a, perimeter edge or cut edge surface or region 614c and the rear surface 614b. Also, an overcoating layer 624 (such as a thin ruthenium coating) may be established at and may overcoat the layers of the NiCr layer portions 622a-c, the silver or silver alloy coating 623, and the second NiCr layer 625 at the front or third surface 614a and the cut edge surface 614c and the rear surface 614b of the rear substrate 614. The cut edge surface or region 614c of the rear substrate 614 thus may be partially or entirely overcoated by a conductive coating layer 628 that may comprise any or all of the first NiCr coating 622b, the silver or silver alloy coating 623, the second NiCr coating 625 and the ruthenium coating 624. Thus, the rear substrate 614 has a rear surface conductive coating or stack of coatings 629 at the rear surface of the rear substrate (that comprises the first NiCr coating 622c, the silver or silver alloy coating 623, the second NiCr coating 625 and the ruthenium coating 624) and generally along a perimeter region of the rear surface of the rear substrate and in electrical conductive continuity with the coatings established at the front or third surface of the rear substrate.

During manufacture of the mirror reflective element assembly, and with reference to FIG. 13, the coatings or layers may be sputter deposited on the surfaces of the rear substrate via suitable sputter targets, such as in a known manner (and/or such as by utilizing aspects of the mirror assemblies and assembly processes described in U.S. Pat. No. 7,255,451, which is hereby incorporated herein by reference in its entirety). For example, and as shown in FIG. 13, the rear substrate 614 may be masked by one or more masks or masking elements 630 and then conveyed or moved or positioned at the sputter targets, such as nickel chromium (NiCr) sputter targets 634 and 632 for sputter coating the Nickel chromium material or layers 622a-c at the front and rear surfaces of the rear substrate and at least partially at the cut edge surface 614c of the rear substrate. After the NiCr coatings or layers are deposited at a desired thickness on the surface or surfaces, the rear substrate is moved to or positioned at overcoating targets, such as, for example, silver or silver alloy (such as APC or the like) targets 638 and 639, which establish the silver or silver alloy coating or layer 623 at the first NiCr layers 622a-c, and the substrate is then moved to or positioned at NiCr overcoating targets 640, 642, which establish the second NiCr layer 625 at and over the silver or silver alloy layer 623 at the front and rear surfaces of the rear substrate (and at least partially at the cut edge surface). The coated substrate is then moved to or positioned at a ruthenium targets 636, 644 for sputter coating the ruthenium coating material or layer 624 at the front and rear surfaces and optionally at least a portion of the cut edge surface of the rear substrate.

Figure 14:
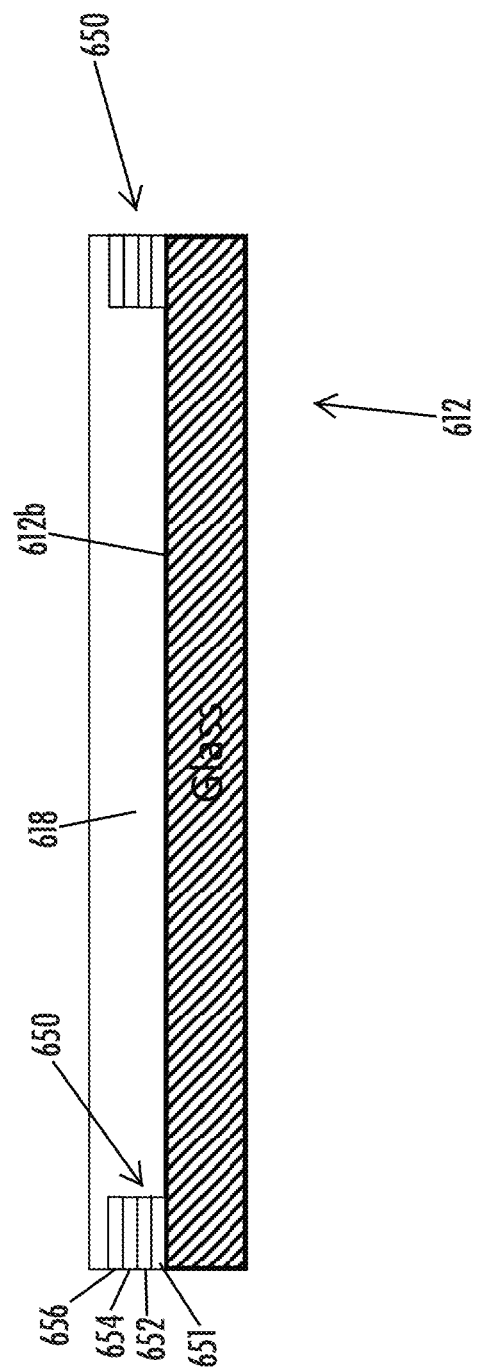
FIG. 14 is a sectional view of a front substrate of an electrochromic reflective element having a perimeter band or hiding band in accordance with the present invention.

Optionally, the reflective element may include a metallic perimeter band around the perimeter of the front substrate of the reflective element, such as described above and/or such as by utilizing aspects of the reflective elements described in U.S. Pat. Nos. 7,626,749; 7,274,501; 7,184,190 and/or 7,255,451, and/or U.S. patent application Ser. No. 11/226,628, filed Sep. 14, 2005 and published Mar. 23, 2006 as U.S. Publication No. US-2006-0061008, which are hereby incorporated herein by reference in their entireties. Optionally, the perimeter band may comprise multiple layers or coatings. For example, and as can be seen with reference to FIG. 14, a front glass substrate 612 for a reflective element assembly (such as for an exterior rearview mirror assembly of a vehicle) includes a perimeter band 650 disposed along the perimeter region of the rear or second surface 612b of the front substrate 612. In the illustrated embodiment, the perimeter band 650 comprises a first layer of chromium 651 deposited or established at the second surface 612b of the front glass substrate 612 and around or along the perimeter region of the substrate surface, with a layer of nickel chromium (NiCr) 652 deposited or established over the first layer 651, and with a layer 654 of silver or silver alloy (such as an APC alloy or the like) deposited or established over the first layer of NiCr 652, and with a second layer 656 of NiCr deposited or established over the silver or silver alloy layer 654. The perimeter band stack of layers may be over coated with a transparent conductive coating 618 (such as ITO or the like) that is deposited or established at the second surface or rear surface 612b of the front glass substrate 612 (such as an ITO coating having a thickness of, for example, about 1200 angstroms or more or less and providing a sheet resistance of, for example, about 12 ohms/square or more or less).

Such a stack of layers for the perimeter band provides increased electrical conductivity at the band, which enhances the speed of coloring/dimming and bleaching of the electrochromic reflective element and enhances the uniformity of the coloring/dimming and bleaching of the electrochromic reflective element. Also, the addition of the thin chromium layer 651 (such as about a 700 angstrom thick layer or thereabouts) at the rear glass surface provides enhanced appearance of the reflective element due to the hiding function of the chromium layer, which conceals or hides the perimeter band layers 652, 654, 656 disposed behind and at the chromium layer 651. This is beneficial because it has been found that the APC and NiCr layers may yellow or tint during the process of coating the transparent conductive layer or ITO layer 618 at the rear surface 612b of the front substrate 612 (where the glass substrate is heated to a temperature of about 350 degrees C.), possibly due to migration or interfusion of the APC into the NiCr layer or layers when the substrate and perimeter band coatings or layers are heated. Aspects of the present invention may be incorporated into an interior mirror reflective element assembly or an exterior mirror reflective element assembly while remaining within the spirit and scope of the present invention.

After the front and rear substrates (such as, for example, front substrate 612 and rear substrate 614, discussed above) are coated and assembled together to form the mirror reflective element 610 (FIGS. 15 and 16), an electrical connector may be attached or adhered at the coating or stack of coatings 629 established at the rear surface 614b of the rear substrate and at the perimeter band 650 and ITO layer 618 established at the perimeter region of the rear surface 612b of the front substrate, such as via a silver conductive epoxy (or ink) disposed at and between the electrical connector (which may comprise any suitable connector, such as a silver plated nickel connector or tab that an electrical lead or wire may clip or otherwise connect to) and the silver alloy coating, such as in a similar manner as described above. Electrical connection may be established at the electrical connector so that electrical power may be provided to the third surface electrically conductive coatings and to the second surface transparent electrically conductive coating for dimming or varying the reflectance of the reflective element assembly.

Typically, such electrical connections are established at a bead of conductive epoxy that is disposed substantially along a coated perimeter region of the rear surface of the rear substrate and a bead of conductive epoxy that is disposed substantially along one of the perimeter edges coated with the perimeter band layer at the rear surface of the front substrate. Because of the low sheet resistance of the coatings or layers at the rear surface of the rear substrate and the low sheet resistance of the perimeter band layers at the rear surface of the front substrate (where both layers may provide a conductive layer that provides a sheet resistance of less than about 1 ohm per square, preferably less than about 0.5 ohms per square, and preferably less than about 0.25 ohms per square or thereabouts, at the respective substrate surfaces), the present invention avoids the necessity of a bead of conductive epoxy disposed substantially along perimeter regions of the front and rear substrates. Instead, the reflective element of the present invention provides an electrical connection or point contact or localized contact at a center region of the respective front and rear substrates. Locating the electrical connection at the geometrical center or center region of the reflective element substrates is preferred to provide more uniform dimming of the electrochromic medium of the reflective element when power is applied at the connection locations.

For example, and as shown in FIGS. 15 and 16, an electrical contact or connection 660 is established at the conductive layer 629 at the rear surface 614b of the rear substrate 614, while an electrical contact or connection 662 is established at the conductive perimeter band 650 and transparent conductive coating 618 at the rear surface 612b of the front substrate 612. In the illustrated embodiment, the electrical connections comprise a small amount of a conductive epoxy disposed or dispensed at the center region of the perimeter region of the respective substrates. An electrical lead or clip may be electrically conductively connected at the conductive epoxy (or a clip may be provided that obviates the need for the conductive epoxy) to provide electrical connection to a point or localized central region of the perimeter region of the respective substrate. Although described as a small amount of conductive epoxy locally dispensed at the central region of the perimeter region of the respective substrate, clearly other means for establishing an electrically conductive connection at the perimeter region of the substrate may be implemented, such as, for example, ultrasonic soldering of a wire or lead at the coated perimeter region or the like, while remaining within the spirit and scope of the present invention.

Thus, the reduced sheet resistance provided by the perimeter band coatings and the rear substrate coatings of the present invention (which have substantially reduced sheet resistance as compared to conventional coatings) provides for localized electrical connections at the substrates that obviate the use of a bead of conductive epoxy that has typically previously been dispensed along substantially the entire perimeter region of the substrates. Thus, the present invention may provide for a substantial cost savings due to the substantial reduction in use of conductive epoxy (or nearly or complete elimination of the conductive epoxy) for making or establishing electrical contact to the electrically conductive coatings or layers at the front and rear substrates of the reflective element (and reduction in processing by no longer dispensing a bead of conductive epoxy along the perimeter region of the substrates).

As discussed above, the rearview mirror reflective element assembly of the present invention comprises an electro-optic or electrochromic reflective element assembly or cell, such as an electrochromic mirror reflective element assembly with coated substrates that are coated utilizing principles disclosed in commonly assigned U.S. Pat. Nos. 7,310,178; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407; 4,712,879; 5,825,527 and/or 5,818,625, and/or U.S. Publication No. US 2010/0321758, published Dec. 23, 2010, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly that receives or incorporates the mirror reflective element assembly or cell constructed in accordance with the present invention.

Typically, the material for the substrates comprises glass, such as soda-lime glass or the like, but other materials, such as polycarbonate or other polymeric materials may be utilized without affecting the scope of the present invention. The completed mirror cells or reflective element assemblies include a front substrate and a rear substrate. The rear substrate may have a reflective coating on its front surface (toward the front substrate when the substrates are sandwiched together, and typically referred to as the third surface of the mirror reflective element assembly), while the front substrate may have a transparent semiconductive coating, such as a coating of indium tin oxide (ITO) or doped indium tin oxide or the like, on its rear surface (toward the rear substrate when the substrates are sandwiched together, and typically referred to as the second surface of the mirror reflective element assembly).

Although shown as having generally flush edges, the cells manufactured by the process of the present invention may have generally or substantially flush edges or offset edges or overhang regions or the like, while remaining within the spirit and scope of the present invention, such as the types of cells described in U.S. Pat. Nos. 7,274,501; 7,184,190 and/or 7,255,451, which are hereby incorporated herein by reference in their entireties, or may have other forms or shapes, such as the mirror shapes described in U.S. Pat. No. 7,110,156, and/or shown in U.S. Design Pat. Nos. D493,131 and/or D493,394, which are hereby incorporated herein by reference in their entireties. Optionally, aspects of the present invention may be used in mirror reflective element assemblies that utilize aspects of the reflective element assemblies and mirror assemblies described in U.S. Des. Pat. Nos. D633,423; D633,019; D638,761 and/or D647,017, and/or PCT Application No. PCT/US2011/056295, filed Oct. 14, 2011, and/or PCT Application No. PCT/US2010/032017, filed Apr. 22, 2010 and published Oct. 28, 2010 as International Publication No. WO 2010/124064, and/or PCT Application No. PCT/US10/51741, filed Oct. 7, 2010 and published Apr. 14, 2011 as International Publication No. WO 2011/044312, and/or U.S. Pat. No. 7,253,723 and/or U.S. patent application Ser. No. 12/414,190, filed Mar. 30, 2009, now U.S. Pat. No. 8,154,418, and/or U.S. provisional applications, Ser. No. 61/614,877, filed Mar. 23, 2012; Ser. No. 61/601,756, filed Feb. 22, 2012; Ser. No. 61/590,578, filed Jan. 25, 2012; Ser. No. 61/565,541, filed Dec. 1, 2011; and/or Ser. No. 61/558,623, filed Nov. 11, 2011, which are hereby incorporated herein by reference in their entireties.

Although shown and described as being implemented in an exterior rearview mirror assembly, aspects of the present invention may be suitable for application with interior rearview mirror assemblies, which are typically attached to an interior portion of the vehicle, such as to an inner surface of a vehicle windshield (such as to a mounting button or attachment element adhered to the interior surface of the vehicle windshield). The mirror assembly may be mounted at or attached to an interior portion of the vehicle (such as to a mounting button or the like at an interior surface of the vehicle windshield or the like) via any mounting means, such as a single ball or single pivot mounting arrangement, or a double ball or double pivot mirror mounting arrangement. Examples of double pivot or double ball mounting arrangements are described in commonly assigned U.S. Pat. Nos. 4,646,210 and 6,331,066, which are hereby incorporated herein by reference in their entireties. The mounting assembly may be mounted to a mounting button or attachment element at the vehicle windshield via a breakaway mounting construction, such as by utilizing aspects of the mounting constructions described in U.S. Pat. Nos. 6,774,810; 6,642,851; 6,483,438; 6,366,213; 6,326,900; 6,222,460; 6,172,613; 6,087,953; 5,820,097; 5,377,949; 5,330,149 and/or 5,100,095, which are hereby incorporated herein by reference in their entireties. The mounting assembly may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. patent application Ser. No. 11/226,628, filed Sep. 14, 2005 and published Mar. 23, 2006 as U.S. Publication No. US-2006-0061008, and/or U.S. patent application Ser. No. 13/258,850, filed Sep. 22, 2011, now U.S. Pat. No. 8,451,332; and/or Ser. No. 12/912,253, filed Oct. 26, 2010, now U.S. Pat. No. 8,851,690, which are hereby incorporated herein by reference in their entireties). Optionally, the mirror assembly may incorporate a mounting arrangement of the types described in U.S. Pat. Nos. 7,289,037; 7,249,860; and/or 7,448,589, and/or U.S. patent application Ser. No. 10/522,446, filed Jan. 19, 2005 and published Nov. 10, 2005 as U.S. Patent Publication No. 2005-0248168, which are hereby incorporated herein by reference in their entireties.

Although such transflective reflective element assemblies are capable of transmitting the illumination or display information through the assembly, it is sometimes desirable to provide a window in the metallic reflective coating through which the display information or illumination may be transmitted. Typically, such windows in the reflective coating of transflective reflective element assemblies are desirable for a glare sensor (such as a photo sensor or the like, such as a glare sensor and/or an ambient light sensor and electrochromic automatic dimming circuitry described in U.S. Pat. Nos. 4,793,690; 5,193,029 and/or 7,004,593, which are all hereby incorporated herein by reference in their entireties) or the like to be positioned at, in order to allow substantial transmission of light from the rear of the mirror assembly or vehicle through the reflective element assembly to the glare sensor positioned within the mirror assembly. The sensors may comprise glare sensors or photo sensors (such as sensors of the types described in U.S. Pat. Nos. 4,793,690; 5,193,029 and/or 7,004,593, which are all hereby incorporated herein by reference in their entireties), or touch or proximity sensors (such as the sensors of the types described in U.S. Pat. No. 7,249,860, which is hereby incorporated herein by reference in its entirety).

Optionally, the mirror assembly may include one or more displays, such as the types disclosed in U.S. Pat. Nos. 5,530,240 and/or 6,329,925, and/or U.S. patent application Ser. No. 13/333,337, filed Dec. 21, 2011 and published Jun. 28, 2012 as U.S. Publication No. US-2012-0162427; and/or PCT Application No. PCT/US2011/056295, filed Oct. 14, 2011 and published Apr. 19, 2012 as International Publication No. WO 2012/051500, which are hereby incorporated herein by reference in their entireties, and/or display-on-demand transflective type displays, such as the types disclosed in U.S. Pat. Nos. 7,855,755; 7,626,749; 7,581,859; 7,338,177; 7,274,501; 7,255,451; 7,195,381; 7,184,190; 5,668,663; 5,724,187 and/or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, which are hereby incorporated herein by reference in their entireties. Such display devices may transmit the display information or illumination through a transflective, third surface reflective element assembly, such as described in U.S. Pat. Nos. 5,668,663; 5,724,187; 6,690,268; 7,195,381; 7,184,190; 7,255,451 and/or 7,274,501, which are all hereby incorporated herein by reference in their entireties.

Optionally, a display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

The display may comprise a video display and may utilize aspects of the video display devices or modules described in U.S. Pat. Nos. 7,855,755; 6,690,268; 7,184,190; 7,274,501; 7,370,983 and/or 7,446,650, and/or U.S. patent application Ser. No. 10/538,724, filed Jun. 13, 2005 and published Mar. 9, 2006 as U.S. Publication No. US-2006-0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, which are all hereby incorporated herein by reference in their entireties. The camera or camera module may comprise any suitable camera or imaging sensor, and may utilize aspects of the cameras or sensors described in U.S. patent application Ser. No. 12/091,359, filed Apr. 24, 2008 and published Oct. 1, 2009 as U.S. Publication No. US-2009-0244361, U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 7,965,336; 7,720,580; 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577 and 7,004,606; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606 and 7,339,149, and U.S. patent application Ser. No. 11/105,757, filed Apr. 14, 2005, now U.S. Pat. No. 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 7,859,565; 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563 and 6,946,978, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009 and published Apr. 22, 2010 as U.S. Publication No. US-2010-0097469, which are hereby incorporated herein by reference in their entireties.

Optionally, the mirror assembly may include a compass system and compass circuitry, such as a compass system utilizing aspects of the compass systems described in U.S. Pat. Nos. 7,289,037; 7,249,860; 7,004,593; 6,642,851; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and/or 6,513,252, and/or European patent application, published Oct. 11, 2000 under Publication No. EP 0 1043566, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349 and/or 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971, published Sep. 10, 2004 (which is hereby incorporated herein by reference in its entirety), or a Hall-effect sensor, such as the types described in U.S. Pat. Nos. 6,278,271; 5,942,895 and/or 6,184,679 (which are hereby incorporated herein by reference in its entirety). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460 and 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; 5,632,092; 7,289,037 and/or 7,004,593, which are all hereby incorporated herein by reference in their entireties.

Optionally, the mirror assembly may include user inputs that may comprise buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 6,001,486; 6,310,611; 6,320,282; 6,627,918; 6,690,268; 7,224,324; 7,249,860; 7,253,723; 7,255,451; 7,360,932 and/or 7,446,924, and/or U.S. patent application Ser. No. 10/538,724, filed Jun. 13, 2005 and published Mar. 9, 2006 as U.S. Publication No. US-2006-0050018, and/or Ser. No. 12/576,550, filed Oct. 12, 2009, now U.S. Pat. No. 8,465,161, which are all hereby incorporated herein by reference in their entireties, or such as fabric-made position detectors, such as those described in U.S. Pat. Nos. 6,504,531; 6,501,465; 6,492,980; 6,452,479; 6,437,258 and 6,369,804, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322 and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593 and/or 6,678,614, and/or U.S. patent application Ser. No. 10/538,724, filed Jun. 13, 2005 and published Mar. 9, 2006 as U.S. Publication No. US-2006-0050018, and/or U.S. patent application Ser. No. 10/529,715, filed Mar. 30, 2005, now U.S. Pat. No. 7,657,052, which are all hereby incorporated herein by reference in their entireties.

Optionally, the mirror assembly may include one or more other accessories at or within the mirror casing or otherwise associated with or near the mirror assembly, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093 and/or U.S. provisional application Ser. No. 61/785,565, filed May 15, 2009, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 6,243,003; 6,278,377 and/or 6,420,975; and/or U.S. patent application Ser. No. 10/529,715, filed Mar. 30, 2005, now U.S. Pat. No. 7,657,052, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot or object detection system, such as disclosed in U.S. Pat. Nos. 8,058,977; 7,720,580; 5,929,786; 5,786,772; 7,492,281; 7,038,577 and 6,882,287, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, and/or U.S. provisional application Ser. No. 61/785,565, filed May 15, 2009, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,881,496; 7,526,103; 7,400,435; 6,690,268 and 6,847,487, and/or U.S. patent application Ser. No. 12/578,732, filed Oct. 14, 2009 and published Apr. 22, 2010 as U.S. Publication No. US-2010-0097469; and/or Ser. No. 12/508,840, filed Jul. 24, 2009 and published Jan. 28, 2010 as U.S. Publication No. US-2010-0020170, an alert system, such as an alert system of the types described in PCT Application No. PCT/US2010/25545, filed Feb. 26, 2010, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or U.S. provisional application, Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442 and/or 5,632,092, a control system, such as a control system of the types described in U.S. provisional application Ser. No. 61/186,573, filed Jun. 12, 2009, and/or any other accessory or circuitry or the like (with the disclosures of the above-referenced patents and patent applications and provisional applications and PCT applications being hereby incorporated herein by reference in their entireties).

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as BLUETOOTH®, SCP, UBP, J1850, CAN J2284, Fire Wire 1394, MOST, LIN, FLEXRAY™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. Pat. No. 7,004,593, which is hereby incorporated herein by reference in its entirety, without affecting the scope of the present invention.

Optionally, a reflective element assembly of the present invention (such as for an interior or exterior rearview mirror assembly) may include a photo sensor or light sensor (such as the types described in U.S. Pat. Nos. 6,831,268; 6,742,904; 6,737,629; 5,406,414; 5,253,109; 4,799,768; 4,793,690 and/or 7,004,593, which are hereby incorporated herein by reference in their entireties) at the rear or fourth surface of the reflective element assembly, such that the photo sensor detects light passing through the reflective element assembly. Examples of such configurations are described in U.S. Pat. Nos. 4,793,690; 5,550,677; 5,193,029 and/or 7,004,593, which are all hereby incorporated herein by reference in their entireties. The reflective element assembly thus may have a window or transmissive port or portion at the photo sensor or, and preferably, may comprise a transflective display on demand (DOD) type reflective element assembly or cell, such as, for example, the types described in U.S. Pat. Nos. 5,668,663; 5,724,187; 6,690,268; 7,195,381; 7,274,501; 7,255,451 and/or 7,184,190, which are all hereby incorporated herein by reference in their entireties. The transflective reflective element assembly may have a fixed attenuation such that only a relatively small amount of light passes therethrough, such as about 12 to 25 percent of the light incident on the reflective element assembly, such that the signal to dark current ratio generated at the sensor may be substantially reduced. Because the photo sensor may have a relatively small sensing area, the sensor may not receive or sense a substantial amount of light passing through the reflective element assembly. Therefore, it is envisioned that a light concentrator (such as a lens and/or light channel and/or light pipe and/or other light concentrating device) may be positioned at the photo sensor to focus or direct the light passing through a larger area of the reflective element assembly onto the smaller sensing area of the photo sensor.

Note that electrochromic mirror cells or reflective element assemblies made such as by any of the processes of the present invention can be included in complete mirror assemblies that include a variety of added-features, such as lighting, telematics functionality and electronics, such as are disclosed in U.S. Pat. Nos. 7,657,052; 7,308,341; 7,195,381; 7,167,796; 7,004,593; 6,690,268; 6,477,464; 6,472,979; 6,445,287; 6,420,975; 6,294,989; 6,278,377; 6,243,003; 6,042,253; 5,938,321; 5,924,212; 5,813,745; 5,820,245; 5,669,698; 5,673,994; 5,671,996; 5,649,756; 5,632,092; 5,255,442; 5,178,448; 5,131,154; 4,937,945; 4,862,594; 4,807,096; 4,733,336 and/or 4,646,210, which are all hereby incorporated herein by reference in their entireties.

Changes and modifications in the specifically described embodiments may be carried out without departing from the principles of the present invention, which is intended to be limited only by the scope of the appended claims, as interpreted according to the principles of patent law.

The invention claimed is:

1. A variable reflectance vehicular electro-optic rearview mirror reflective element assembly comprising:
 a front substrate having a first surface that generally faces a driver of a vehicle equipped with a mirror assembly that incorporates said rearview mirror reflective element assembly;
 said front substrate having a second surface opposite said first surface, wherein said second surface of said front substrate has a transparent electrically conductive coating disposed thereat;
 wherein said front substrate has a perimeter band disposed along a perimeter region of said second surface;
 wherein said perimeter band comprises (i) a layer of chromium established at said second surface, (ii) a first layer of nickel chromium established at said layer of chromium, (iii) a layer of silver or silver alloy established at said first layer of nickel chromium, and (iv) a second layer of nickel chromium established at said layer of silver or silver alloy;
 a rear substrate having a third surface and a fourth surface, wherein said third surface has a conductive reflector coating disposed thereat;
 a perimeter seal disposed between said front and rear substrates, said perimeter seal spacing said front and rear substrates apart and forming an interpane cavity therebetween; and
 wherein said third surface conductive reflector coating comprises a plurality of layers, and wherein said plurality of layers comprises (i) a first layer of nickel chromium, (ii) a silver or silver alloy layer established at said first layer of nickel chromium, (iii) a second layer of nickel chromium established at said silver or silver alloy layer, and (iv) a reflective layer established at said second layer of nickel chromium, wherein said reflective layer comprises one of ruthenium, rhodium, platinum and palladium.

2. The mirror assembly of claim 1, wherein said first layer of nickel chromium of said third surface conductive reflector coating has a thickness of no more than around 300 angstroms.

3. The mirror assembly of claim 2, wherein said silver or silver alloy layer of said third surface conductive reflector coating has a thickness of between about 100 angstroms and about 1,000 angstroms.

4. The mirror assembly of claim 3, wherein said second nickel chromium layer of said third surface conductive reflector coating has a thickness of no more than about 300 angstroms.

5. The mirror assembly of claim 4, wherein said reflective layer of said third surface conductive reflector coating comprises a ruthenium layer having a thickness of about 200 angstroms to about 400 angstroms.

6. The mirror assembly of claim 1, wherein said plurality of layers of said third surface conductive reflector coating has a sheet resistance of less than about 0.5 ohms per square and wherein said perimeter band has a sheet resistance of less than about 0.5 ohms per square.

7. The mirror assembly of claim 6, wherein said plurality of layers of said third surface conductive reflector coating are disposed over a perimeter region of said fourth surface of said rear substrate and wherein electrical connection is established at said plurality of layers at said fourth surface at a central location of said perimeter region of said fourth surface of said rear substrate, and wherein electrical connection is established at said perimeter band at said second surface at a central location of said perimeter region of said second surface of said front substrate.

8. The mirror assembly of claim 1, wherein said plurality of layers of said third surface conductive reflector coating has a sheet resistance of less than about 1 ohm per square and wherein said perimeter band has a sheet resistance of less than about 1 ohm per square.

9. A variable reflectance vehicular electro-optic rearview mirror reflective element assembly comprising:
- a front substrate having a first surface that generally faces a driver of a vehicle equipped with a mirror assembly that incorporates said rearview mirror reflective element assembly;
- said front substrate having a second surface opposite said first surface, wherein said second surface of said front substrate has a transparent electrically conductive coating disposed thereat;
- a rear substrate having a third surface and a fourth surface, wherein said third surface has a conductive reflector coating disposed thereat;
- a perimeter seal disposed between said front and rear substrates, said perimeter seal spacing said front and rear substrates apart and forming an interpane cavity therebetween;
- an electrochromic medium disposed in said interpane cavity to provide an electrochromically-active region;
- wherein said electrochromically-active region has an area of at least about 175 square centimeters; and
- wherein said third surface conductive reflector coating comprises a plurality of layers, and wherein said plurality of layers comprises (i) a first layer of nickel chromium, (ii) a silver or silver alloy layer established at said first layer of nickel chromium, (iii) a second layer of nickel chromium established at said silver or silver alloy layer, and (iv) a reflective layer established at said second layer of nickel chromium, wherein said reflective layer comprises one of ruthenium, rhodium, platinum and palladium.

10. The mirror assembly of claim 9, wherein said first layer of nickel chromium of said third surface conductive reflector coating has a thickness of no more than around 300 angstroms.

11. The mirror assembly of claim 10, wherein said silver or silver alloy layer of said third surface conductive reflector coating has a thickness of between about 100 angstroms and about 1,000 angstroms.

12. The mirror assembly of claim 11, wherein said second nickel chromium layer of said third surface conductive reflector coating has a thickness of no more than about 300 angstroms.

13. The mirror assembly of claim 12, wherein said reflective layer of said third surface conductive reflector coating comprises a ruthenium layer having a thickness of about 200 angstroms to about 400 angstroms.

14. The mirror assembly of claim 9, wherein said plurality of layers of said third surface conductive reflector coating has a sheet resistance of less than about 1 ohm per square.

15. The mirror assembly of claim 14, wherein said plurality of layers of said third surface conductive reflector coating are disposed over a perimeter region of said fourth surface of said rear substrate and wherein electrical connection is established at said plurality of layers at said fourth surface at a central location of said perimeter region of said fourth surface of said rear substrate, and wherein electrical connection is established at said perimeter band at said second surface at a central location of said perimeter region of said second surface of said front substrate.

16. The mirror assembly of claim 9, wherein said front substrate has a perimeter band disposed along a perimeter region of said second surface, and wherein said perimeter band comprises (i) a layer of chromium established at said second surface, (ii) a first layer of nickel chromium established at said layer of chromium, (iii) a layer of silver or silver alloy established at said first layer of nickel chromium, and (iv) a second layer of nickel chromium established at said layer of silver or silver alloy.

17. A variable reflectance vehicular electro-optic rearview mirror reflective element assembly comprising:
- a front substrate having a first surface that generally faces a driver of a vehicle equipped with a mirror assembly that incorporates said rearview mirror reflective element assembly;
- said front substrate having a second surface opposite said first surface, wherein said second surface of said front substrate has a transparent electrically conductive coating disposed thereat;
- wherein said front substrate has a perimeter band disposed along a perimeter region of said second surface;
- wherein said perimeter band comprises (i) a layer of chromium established at said second surface, (ii) a first layer of nickel chromium established at said layer of chromium, (iii) a layer of silver or silver alloy established at said first layer of nickel chromium, and (iv) a second layer of nickel chromium established at said layer of silver or silver alloy;
- a rear substrate having a third surface and a fourth surface, wherein said third surface has a conductive reflector coating disposed thereat;
- a perimeter seal disposed between said front and rear substrates, said perimeter seal spacing said front and rear substrates apart and forming an interpane cavity therebetween; and
- an electrochromic medium disposed in said interpane cavity to provide an electrochromically-active region.

18. The mirror assembly of claim 17, wherein said layer of chromium has a thickness of about 700 angstroms.

19. The mirror assembly of claim 17, wherein said perimeter band has a sheet resistance of less than about 1 ohm per square.

20. The mirror assembly of claim 19, wherein said plurality of layers of said third surface conductive reflector coating are disposed over a perimeter region of said fourth surface of said rear substrate and wherein electrical connection is established at said plurality of layers at said fourth surface at a central location of said perimeter region of said fourth surface of said rear substrate, and wherein electrical connection is established at said perimeter band at said second surface at a central location of said perimeter region of said second surface of said front substrate.

* * * * *